United States Patent [19]

Fujikawa et al.

[11] Patent Number: 5,650,367

[45] Date of Patent: Jul. 22, 1997

[54] DIELECTRIC CERAMIC COMPOSITION

[75] Inventors: Nobuyoshi Fujikawa; Yoshihiro Fujioka; Yasushi Yamakuchi; Shin-ichi Osawa; Hiroshi Ojima, all of Kokubu, Japan

[73] Assignee: Kyocera Corporation, Kyoto, Japan

[21] Appl. No.: 545,459

[22] Filed: Oct. 19, 1995

[30] Foreign Application Priority Data

| Jan. 28, 1994 | [JP] | Japan | 6-293030 |
| Oct. 19, 1994 | [JP] | Japan | 6-253345 |
| Oct. 28, 1994 | [JP] | Japan | 6-264786 |
| Dec. 20, 1994 | [JP] | Japan | 6-316660 |
| Dec. 28, 1994 | [JP] | Japan | 6-327302 |

[51] Int. Cl.$^6$ .................................. C04B 35/468
[52] U.S. Cl. .............................. 501/139; 501/137
[58] Field of Search ............................ 501/139, 137

[56] References Cited

U.S. PATENT DOCUMENTS

| Re. 29,484 | 11/1977 | Utsumi et al. | 501/139 |
| 3,529,978 | 9/1970 | Taylor et al. | 501/138 |
| 3,788,867 | 1/1974 | Rutt | 501/137 |
| 4,222,783 | 9/1980 | Atsumi et al. | 501/138 |
| 4,459,364 | 7/1984 | McSweeney et al. | 501/137 |
| 5,128,289 | 7/1992 | Wilson | 501/137 |
| 5,238,887 | 8/1993 | Kato et al. | 501/138 |
| 5,322,828 | 6/1994 | Sano et al. | 501/137 |
| 5,361,187 | 11/1994 | Srinivasan | 501/139 |
| 5,397,753 | 3/1995 | Nishiyama et al. | 501/139 |
| 5,403,797 | 4/1995 | Ohtani et al. | 501/139 |
| 5,554,571 | 9/1996 | Okabe et al. | 501/139 |
| 5,571,767 | 11/1996 | Wilson et al. | 501/139 |

FOREIGN PATENT DOCUMENTS

| 6386319 | 9/1986 | Japan . | |
| 4-357616 | 12/1992 | Japan | 501/139 |
| 4-357612 | 12/1992 | Japan | 501/139 |
| 4-357611 | 12/1994 | Japan | 501/139 |

*Primary Examiner*—Karl Group
*Assistant Examiner*—Louis M. Troilo
*Attorney, Agent, or Firm*—Loeb & Loeb LLP

[57] ABSTRACT

A dielectric ceramic composition containing, per 100 parts by weight of $BaTiO_3$, at least either one of $Nb_2O_5$ or $Ta_2O_5$ in an amount of from 0.8 to 3.5 parts by weight, MgO in an amount of from 0.06 to 0.7 parts by weight, oxides of rare earth elements in an amount of from 0.005 to 0.520 parts by weight, and MnO in an amount of from 0.01 to 0.30 parts by weight in the form of $MnCO_3$, the molar ratio of MgO to either $Nb_2O_5$ or $Ta_2O_5$ being from 0.5 to 2.2. The dielectric ceramic composition has a dielectric constant of not smaller than 2500, is fired at a temperature of not higher than 1300° C., exhibits a change of capacitance depending upon the temperature satisfying X7R of the IEA Standards, a dielectric loss of not larger than 2.5%, a small voltage dependence, and an insulation resistance of not smaller than $10^4$ MΩ, and is suited as a material for producing ceramic capacitors and resonators.

18 Claims, No Drawings

DIELECTRIC CERAMIC COMPOSITION

BACKGROUND OF THE INVENTION

1. (Field of the Invention)

The present invention relates to a dielectric ceramic composition. More specifically, the invention relates to a dielectric ceramic composition which contains $BaTiO_3$ as a chief component, as well as $Nb_2O_5$ and/or $Ta_2O_5$, MgO, oxides of rare earth elements and MnO, and which can be preferably used as a material of ceramic capacitors and resonators.

2. (Description of the Related Art)

Dielectric ceramic compositions have heretofore been used as materials for multi-layer ceramic capacitors. Such a multi-layer ceramic capacitor is fabricated by stacking plural pieces of a green sheet of a dielectric ceramic composition having an internal electrode formed therein such that a predetermined capacitance is obtained followed by firing as a unitary structure. For instance, a dielectric ceramic composition used for a multi-layer ceramic capacitor of X7R (EIA Standards: change of capacitance is within ±15% over a temperature range of from −55° C. to +125° C.) has a dielectric constant of as high as not smaller than 2500 at +25° C., and has a thickness of not larger than 15 μm per a piece of green sheet. It is important here that the firing temperature is not higher than, for example, 1300° C.

That is, by employing a green sheet having a dielectric constant of not smaller than 2500 at 25° C. and a thickness of not larger than 15 μm, it is allowed to minimize the thickness of the raw green between the internal electrodes and to minimize the opposing areas and, hence, to realize a multi-layer ceramic capacitor in a small size. By selecting the firing temperature to be not higher than 1300° C., furthermore, it is allowed to choose the internal electrodes from an increased variety of materials such as from an expensive material consisting of 100% of palladium through up to cheap Pd-Ag. In addition to the above, sufficient degree of attention must be given to properties of the dielectric ceramic composition such as dielectric loss tan δ and insulation resistance, and it is further desired that the dielectric loss is little dependent upon the AC voltage.

So far, dielectric ceramic compositions containing $BaTiO_3$, $Nb_2O_5$ and ZnO have been proposed already featuring improved dielectric constants (see Japanese Laid-Open Patent Publications Nos. 18162/1984, 18159/1984, etc.). Dielectric constants of from 2000 to 3000 can be obtained by using such dielectric ceramic compositions. Despite of their high dielectric constants, however, such dielectric ceramic compositions have large dielectric losses tan δ making it difficult to decrease the thickness of the green sheet. When used for the multi-layer capacitors, therefore, a large capacitance is not obtained.

In order to decrease the dielectric loss tan δ, a dielectric ceramic composition containing $BaTiO_3$, $Nb_2O_5$, MgO and $La_2O_3$ has been developed already (see Japanese Patent Publication No. 10766/1993). There has further been proposed a composition comprising $BaTiO_3$ to which are added $Nb_2O_5$ and MgO in such amounts that the molar ratio of $Nb_2O_5$/MgO is from 2.3 to 4 as well as rare earth oxides in amounts of from 0.1 to 0.5% by weight (see Japanese Patent Publication No. 19007/1980).

In fact, however, the above-mentioned dielectric ceramics all have dielectric constants of not larger than 2200, with which it is difficult to obtain a capacitor having a large capacitance in a small size. Besides, these dielectric ceramics still have such large dielectric losses that it is difficult to decrease the thickness of the green sheet.

Moreover, the above-mentioned dielectric ceramics all have AC voltage dependence of dielectric loss of not smaller than 3.0% under the application of a voltage of 2000 V/cm, making it difficult to decrease the thickness of the dielectric layer and, hence, making it difficult to obtain a capacitor having a large capacitance in a small size.

SUMMARY OF THE INVENTION

In view of the above-mentioned problems, the present inventors have conducted keen study and have accomplished the present invention after having discovered the fact that a ceramic composition containing barium titanate ($BaTiO_3$) as a chief component as well as $Nb_2O_5$ and/or $Ta_2O_5$, MgO, oxides of rare earth elements and MnO at a predetermined composition ratio, the molar ratio of MgO to $Nb_2O_5$ and/or $Ta_2O_5$ lying within a particular range, exhibits a dielectric constant of as large as not smaller than 2500, has a temperature chararistics of capacitance that satisfies X7R of the EIA Standards, has a dielectric loss of as small as 2.5% or less, and has an AC voltage dependence of as small as 3.0% or less even under the application of an AC voltage of 2000 V/cm.

It is therefore an object of the present invention to provide a dielectric ceramic composition having a dielectric constant of not smaller than 2500, a temperature chararistics of capacitance satisfying X7R of the EIA Standards, a dielectric loss of as small as 2.5% or less, and such a small AC voltage dependence that the dielectric loss is not larger than 3.0% even under the application of an AC voltage of 2000 V/cm.

Another object of the present invention is to provide a dielectric ceramic composition which is obtained in the form of a layer of a decreased thickness, and is suited as a material for producing a multi-layer ceramic capacitor of a small size having a large capacitance.

A further object of the present invention is to provide a dielectric ceramic composition that can be fired at a temperature of not higher than 1300° C. and can be easily produced industrially.

According to the present invention, there is provided a dielectric ceramic composition containing, per 100 parts by weight of $BaTiO_3$, at least either one of $Nb_2O_5$ or $Ta_2O_5$ in an amount of from 0.8 to 3.5 parts by weight, MgO in an amount of from 0.06 to 0.7 parts by weight, oxides of rare earth elements in an amount of from 0.005 to 0.520 parts by weight, and MnO in an amount of from 0.01 to 0.30 parts by weight in the form of $MnCO_3$, the molar ratio of MgO to $Nb_2O_5$ or $Ta_2O_5$ being from 0.5 to 2.2.

According to the present invention, furthermore, there is provided a dielectric ceramic composition which comprises the above-mentioned composition and further containing at least either one of $SiO_2$ or $Al_2O_3$ in an amount of from 0.05 to 0.50 parts by weight per 100 parts by weight of $BaTiO_3$.

According to the present invention, there is further provided a dielectric ceramic composition which comprises the above-mentioned composition and further containing ZnO in an amount of not larger than 0.5 parts by weight per 100 parts by weight of $BaTiO_3$.

DETAILED DESCRIPTION OF THE INVENTION

A dielectric ceramic composition of the present invention contains $BaTiO_3$ as a chief component as well as $Nb_2O_5$ and/or $Ta_2O_5$, MgO, oxides of rare earth elements and MnO in predetermined amounts. Here, in the composition of the present invention, $Nb_2O_5$ and/or $Ta_2O_5$ are contained in amounts over a range of from 0.8 to 3.5 parts by weight per 100 parts by weight of $BaTiO_3$.

When the contents of the above components are smaller than 0.8 parts by weight, the ceramic composition exhibits large dielectric loss, poor temperature characteristics and poor sintering property. When the contents of the above components exceed 3.5 parts by weight, the dielectric constant decreases and the temperature characteristics are greatly deteriorated.

It is desired that $Nb_2O_5$ is contained in an amount within a range of from 1.3 to 3.0 parts by weight per 100 parts by weight of $BaTiO_3$.

MgO is contained in an amount within a range of from 0.06 to 0.7 parts by weight per 100 parts by weight of $BaTiO_3$. When the content of this component is smaller than 0.06 parts by weight, the dielectric constant and insulation resistance decrease, the temperature characteristics are deteriorated, and the voltage dependence of dielectric loss increases. When the content of this component exceeds 0.70 parts by weight, the dielectric constant drops and the insulation resistance decreases, either. It is desired that the amount of MgO lies within a range of from 0.1 to 0.4 parts by weight.

According to the present invention, the oxides of rare earth elements are contained in amounts of from 0.005 to 0.520 parts by weight. Examples of the oxides of rare earth elements used in the present invention include those oxides of, for example, Sc, Y, La, Ce, Pr, Nd, Pm, Sm, Eu, Gd, Tb, Dy, Ho, Er, Tm, Yb and Lu. Among them, $La_2O_3$, $Nd_2O_3$, $Pr_6O_{11}$, $Sm_2O_3$, $Gd_2O_3$, and $Tb_4O_7$ are desirably used.

When the contents of the oxides of rare earth elements are smaller than 0.005 parts by weight, the dielectric constant drops and the sintering property is deteriorated. When their contents exceed 0.520 parts by weight, the temperature characteristics are deteriorated. It is desired that the oxides of rare earth elements are contained in amounts of from 0.005 to 0.2 parts by weight.

In the present invention, furthermore, MnO is contained in an amount of from 0.01 to 0.30 parts by weight in the form of $MnCO_3$.

When the content of this component is smaller than 0.01 part by weight, the insulation resistance decreases, dielectric loss increases and sintering property is deteriorated. When the content of this component exceeds 0.30 parts by weight, the dielectric constant drops. It is desired that MnO is contained in an amount of from 0.04 to 0.10 part by weight in the form of $MnCO_3$.

In the present invention, furthermore, it is important that the molar ratio of MgO to $Nb_2O_5$ and/or $Ta_2O_5$ is over a range of from 0.5 to 2.2. When this molar ratio is smaller than 0.5, the dielectric constant drops, and the temperature characteristics and sintering property are deteriorated. When the molar ratio is larger than 2.2, on the other hand, the temperature characteristics are deteriorated and the dielectric constant drops.

More preferably, it is desired that the molar ratio lies over a range of from 0.6 to 1.4.

According to a preferred embodiment of the present invention, a dielectric ceramic composition contains 0.8 to 2.5 parts by weight of $Nb_2O_5$, 0.06 to 0.70 parts by weight of MgO, 0.005 to 0.520 parts by weight of at least one oxide of a rare earth element selected from $La_2O_3$, $Nd_2O_3$, $Pr_6O_{11}$, $Gd_2O_3$, $Tb_4O_7$ and $Sm_2O_3$, and 0.01 to 0.30 parts by weight of MnO reckoned as $MnCO_3$ per 100 parts by weight of $BaTiO_3$, the molar ratio of MgO to $Nb_2O_5$ lying within a range of from 0.5 to 2.2.

From the standpoint of dielectric properties contemplated by the present invention, it is more desired that, in the above-mentioned composition, the content of $Nb_2O_5$ lies within a range of from 1.3 to 2.0 parts by weight, the content of MgO lies within a range of from 0.1 to 0.4 parts by weight, the contents of the oxides of rare earth elements lie within a range of from 0.005 to 0.2 parts by weight, and the content of MnO lies within a range of from 0.04 to 0.10 reckoned as $MnCO_3$, the above-mentioned molar ratio lying within a range of from 0.6 to 1.4.

According to a second preferred embodiment of the present invention, the dielectric ceramic composition contains 1.3 to 3.5 parts by weight of $Ta_2O_5$, 0.06 to 0.6 parts by weight of MgO, 0.005 to 0.5 parts by weight of oxides of rare earth elements, and 0.01 to 0.30 parts by weight of MnO reckoned as $MnCO_3$ per 100 parts by weight of $BaTiO_3$, the molar ratio of MgO to $Ta_2O_5$ lying within a range of from 0.5 to 2.0.

In the composition of the second embodiment, it is more desired that the content of $Ta_2O_5$ is from 2.0 to 3.0 parts by weight, the content of MgO is from 0.1 to 0.4 parts by weight, the contents of the oxides of rare earth elements are from 0.005 to 0.2 parts by weight, and the content of MnO is from 0.04 to 0.10 part by weight reckoned as $MnCO_3$.

Moreover, it is desired that the molar ratio of MgO to $Ta_2O_5$ is within a range of from 0.6 to 1.4.

It is further desired that the dielectric ceramic composition of either embodiment of the present invention containing $BaTiO_3$, $Nb_2O_5$ and/or $Ta_2O_5$, MgO, oxides of rare earth elements and MnO which are the essential components, further contains at least either one of $SiO_2$ or $Al_2O_3$ in an amount of from 0.05 to 0.50 parts by weight per 100 parts by weight of $BaTiO_3$ from the standpoint of further increasing capacitance and dielectric constant, and lowering the firing temperature depending upon the composition. The above-mentioned action is not so much exhibited when the content of $SiO_2$ or $Al_2O_3$ is not greater than 0.05 parts by weight. When the content of $SiO_2$ or $Al_2O_3$ is larger than 0.50 parts by weight, on the other hand, the dielectric constant drops. More desirably, at least either $SiO_2$ or $Al_2O_3$ is contained in an amount of from 0.1 to 0.2 parts by weight per 100 parts by weight of $BaTiO_3$.

According to the present invention, it is further desired that the dielectric ceramic composition comprising the essential components such as $BaTiO_3$, etc. further contains ZnO alone or in addition to the above-mentioned $SiO_2$ or $Al_2O_3$ in an amount of not larger than 0.5 parts by weight and, particularly, from 0.0001 to 0.3 parts by weight per 100 parts by weight of $BaTiO_3$, in order to further improve insulation resistance, dielectric loss, sintering property, dielectric constant and temperature characteristics of the ceramic composition. When the content of ZnO is larger than 0.5 parts by weight, the temperature characteristics are rather deteriorated and the dielectric loss increases, which are not desirable.

In the dielectric ceramic composition that contains ZnO, it is particularly desired that ZnO is contained in an amount over a range of from 0.1 to 0.5 parts by weight per 100 parts by weight of $BaTiO_3$, and the molar ratio of the total amount of MgO and ZnO to $Nb_2O_5$ or $Ta_2O_5$ is from 0.5 to 2.2 from the standpoint of dielectric constant and temperature characteristics.

According to the present invention, $BaTiO_3$ particles used for preparing the dielectric ceramic composition are those having an average particle diameter of not larger than 1.0 μm and formed by, for example, calcination synthesizing method, sol-gel method, oxalic acid method or hydrothermal synthesizing method.

The dielectric ceramic composition of the present invention is prepared by weighing powders of $Nb_2O_5$ and/or $Ta_2O_5$, MgO, oxides of rare earth elements and, as required, powders of $SiO_2$, $Al_2O_3$ and ZnO in predetermined amounts with respect to 100 parts by weight of $BaTiO_3$, wet-grinding the powders using a ball mill or the like for 20 to 48 hours followed by drying, adding a binder in a predetermined amount thereto to mold the mixture into a predetermined shape, and firing the molded article in an open air at 1200° to 1300° C. for 1 to 2 hours.

To obtain a multi-layer ceramic capacitor, a slurry of the above-mentioned powders is prepared and is formed into a sheet relying upon a doctor blade method, and a suitable internal electrode such as of Ag-Pd is applied onto the sheet. The sheets are then stacked in a plural number one upon the other and are fired under the above-mentioned firing conditions.

Instead of the powders of $Nb_2O_5$, $Ta_2O_5$, MgO, oxides of rare earth elements, $MnCO_3$, $SiO_2$, $Al_2O_3$ and ZnO that are used in the present invention, there can be used hydroxides, carbonates, nitrates, oxalates or alkoxides of Nb, Ta, Mg, rare earth metal elements, Mn, Si, Al and Zn, that decompose at a temperature lower than the sintering temperature to form oxides.

In order to improve AC voltage dependence of the dielectric ceramic composition of the present invention, it is desired to control the average particle diameter d of the sintered product to be d<1.0 μm. To control the average particle diameter d of the sintered product to be d<1.0 μm, it is necessary to use a powder of barium titanate having an average particle diameter of not larger than 1.0 μm as a starting material, or to decrease the particle diameter of the powder to be not larger than 0.8 μm through wet-type milling executed for a long period of time, and to set the firing temperature to be as low as possible and to execute the firing for only a short period of time.

The dielectric ceramic composition of the present invention exhibits a temperature characteristics of capacitance of within ±15% over a range of from −55° C. to 125° C., a dielectric constant at +25° C. of not smaller than 2500, a dielectric loss of as small as 2.5% or less despite a green sheet thereof has a thickness of 15 μm, and a dielectric loss of as small as 3% or less under the application of an AC voltage of 2000 V/cm. It is therefore allowed to obtain a multi-layer capacitor which is small in size but having a large capacitance. Moreover, since the firing temperature is not higher than 1300° C., the dielectric ceramic composition can be easily produced industrially permitting an internal electrode composed of cheaply available silver-palladium (Ag/Pd=20/80 to 40/60) to be incorporated therein, lending the composition itself to be well suited for producing multi-layer capacitors. Furthermore, there is obtained a dielectric ceramic composition having a dielectric loss of not larger than 2.5% and an insulation resistance (IR) of not smaller than $10^4$ MΩ which are sufficiently satisfactory fundamental properties.

EXAMPLES

Examples of the present invention will now be described in detail.

Example 1

A $BaTiO_3$ powder having an average particle diameter of not larger than 1.0 μm formed by the hydrothermal synthesizing method was used as a chief component. Powders of $Nb_2O_5$MgO, $La_2O_3$ and $MnCO_3$ were weighed as shown in Table 1 with respect to 100 parts by Weight of $BaTiO_3$, and were wetgrinded in a ball mill for 20 to 48 hours. Then, an organic binder agent was added thereto followed by milling, and the mixture was formed into a tape having a thickness of 15 μm by the doctor blade method. The tape was cut into 130 mm×100 mm, overlapped in a number of 20 pieces one upon the other and was hot-pressed at 80° C. to prepare a laminate thereof.

TABLE 1

| Sample No. | $BaTiO_3$ pts. by wt | $Nb_2O_5$ pts. by wt. | MgO pts. by wt. | $La_2O_5$ pts. by wt. | $MnCO_3$ pts. by wt. | $Nb_2O_5$/MgO molar ratio | Firing temp. (°C.) |
|---|---|---|---|---|---|---|---|
| 1-*1 | 100 | 0.7 | 0.2 | 0.2 | 0.1 | 0.5 | 1320 |
| 1-2 | 100 | 0.8 | 0.2 | 0.2 | 0.1 | 0.6 | 1300 |
| 1-3 | 100 | 1.6 | 0.2 | 0.2 | 0.1 | 1.2 | 1280 |
| 1-4 | 100 | 2.5 | 0.2 | 0.2 | 0.1 | 2.0 | 1250 |
| 1-*5 | 100 | 0.8 | 0.05 | 0.2 | 0.1 | 2.5 | 1280 |
| 1-6 | 100 | 0.8 | 0.06 | 0.2 | 0.1 | 2.1 | 1280 |
| 1-7 | 100 | 2.3 | 0.3 | 0.2 | 0.1 | 1.2 | 1260 |
| 1-8 | 100 | 2.5 | 0.7 | 0.2 | 0.1 | 0.6 | 1250 |
| 1-*9 | 100 | 2.5 | 0.75 | 0.2 | 0.1 | 0.5 | 1250 |
| 1-*10 | 100 | 1.8 | 0.3 | 0.004 | 0.1 | 0.9 | 1330 |
| 1-11 | 100 | 1.8 | 0.3 | 0.005 | 0.1 | 0.9 | 1300 |
| 1-12 | 100 | 1.8 | 0.3 | 0.2 | 0.1 | 0.9 | 1270 |
| 1-13 | 100 | 1.8 | 0.3 | 0.52 | 0.1 | 0.9 | 1250 |
| 1-*14 | 100 | 1.8 | 0.3 | 0.53 | 0.1 | 0.9 | 1250 |
| 1-*15 | 100 | 1.8 | 0.3 | 0.2 | 0.005 | 0.9 | 1320 |
| 1-16 | 100 | 1.8 | 0.3 | 0.2 | 0.01 | 0.9 | 1300 |
| 1-17 | 100 | 1.8 | 0.3 | 0.2 | 0.05 | 0.9 | 1280 |
| 1-18 | 100 | 1.8 | 0.3 | 0.2 | 0.3 | 0.9 | 1260 |
| 1-*19 | 100 | 1.8 | 0.3 | 0.2 | 0.31 | 0.9 | 1260 |
| 1-*20 | 100 | 0.9 | 0.3 | 0.2 | 0.1 | 0.4 | 1280 |
| 1-*21 | 100 | 2.3 | 0.15 | 0.2 | 0.1 | 2.3 | 1250 |
| 1-22 | 100 | 2.0 | 0.4 | 0.2 | 0.1 | 0.8 | 1250 |
| 1-23 | 100 | 2.2 | 0.6 | 0.2 | 0.1 | 0.8 | 1260 |

TABLE 1-continued

| Sample No. | BaTiO$_3$ pts. by wt | Nb$_2$O$_5$ pts. by wt. | MgO pts. by wt. | La$_2$O$_5$ pts. by wt. | MnCO$_3$ pts. by wt. | Nb$_2$O$_5$/MgO molar ratio | Firing temp. (°C.) |
|---|---|---|---|---|---|---|---|
| 1-24 | 100 | 1.8 | 0.3 | 0.1 | 0.1 | 0.9 | 1280 |
| 1-25 | 100 | 1.8 | 0.3 | 0.3 | 0.1 | 0.9 | 1260 |
| 1-26 | 100 | 1.8 | 0.3 | 0.4 | 0.1 | 0.9 | 1250 |
| 1-27 | 100 | 1.8 | 0.3 | 0.2 | 0.2 | 0.9 | 1280 |
| 1-28 | 100 | 1.4 | 0.1 | 0.2 | 0.1 | 2.2 | 1260 |

Samples marked with * lie outside the scope of the invention.

An Ag paste (Ag/Pd=30/70) was printed to form an internal electrode. The laminate was cut into 3.2 mm×1.6 mm and was fired in the air at 1250° to 1320° C. for two hours. Then, the electrodes of the silver paste were glazed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute.

The dielectric constant was calculated from the capacitance.

As for the average particle diameter of the sintered product, the surface of the sintered product was observed using a scanning-type electron microscope at a magnification of 15000 times, and particles of more than 500 were measured and calculated by the line intercept method. Furthermore, the dielectric loss was measured by applying a voltage of 2000 Vrms/cm at a frequency of 1 KHz. The results were as shown in Table 2.

TABLE 2

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 1-*1 | 170.5 | 3500 | 3.3 | 2 × 10$^4$ | −27−+3 | 0.4 | 4.5 |
| 1-2 | 180.2 | 3700 | 2.5 | 3 × 10$^4$ | −14−+3 | 0.3 | 2.8 |
| 1-3 | 145.1 | 3000 | 1.6 | 8 × 10$^4$ | −5−+5 | 0.4 | 2.4 |
| 1-4 | 130.8 | 2700 | 2.0 | 9 × 10$^4$ | −12−+8 | 0.4 | 2.8 |
| 1-*5 | 110.9 | 2300 | 2.5 | 4 × 10$^3$ | −19−+8 | 1.5 | 4.0 |
| 1-6 | 131.0 | 2700 | 2.0 | 2 × 10$^4$ | −13−+7 | 0.5 | 2.8 |
| 1-7 | 140.3 | 2900 | 1.8 | 8 × 10$^4$ | −6−+5 | 0.4 | 2.6 |
| 1-8 | 149.9 | 3100 | 1.6 | 3 × 10$^4$ | −5−+3 | 0.3 | 2.6 |
| 1-*9 | 116.0 | 2100 | 1.7 | 7 × 10$^3$ | −6−+2 | 0.4 | 2.6 |
| 1-*10 | 112.8 | 2350 | 2.5 | 2 × 10$^4$ | −3−+6 | 0.5 | 3.2 |
| 1-11 | 136.7 | 2800 | 2.0 | 3 × 10$^4$ | −3−+6 | 0.4 | 2.8 |
| 1-12 | 140.6 | 2900 | 1.6 | 7 × 10$^4$ | −5−+6 | 0.4 | 2.4 |
| 1-13 | 174.1 | 3600 | 1.8 | 7 × 10$^4$ | −11−+6 | 0.4 | 2.7 |
| 1-*14 | 185.2 | 3800 | 1.8 | 7 × 10$^4$ | −20−+7 | 0.4 | 2.7 |
| 1-*15 | 144.7 | 3000 | 2.6 | 9 × 10$^3$ | −5−+6 | 0.4 | 3.2 |
| 1-16 | 145.2 | 3000 | 2.2 | 2 × 10$^4$ | −5−+6 | 0.4 | 3.0 |
| 1-17 | 141.0 | 2900 | 1.8 | 9 × 10$^4$ | −5−+5 | 0.5 | 2.7 |
| 1-18 | 136.1 | 2800 | 1.4 | 2 × 10$^5$ | −4−+3 | 0.9 | 2.2 |
| 1-*19 | 102.0 | 2100 | 1.4 | 9 × 10$^4$ | −4−+3 | 0.9 | 2.2 |
| 1-*20 | 111.2 | 2300 | 2.7 | 3 × 10$^3$ | −30−+4 | 0.5 | 3.8 |
| 1-*21 | 97.1 | 2000 | 2.3 | 7 × 10$^4$ | −18−+11 | 0.6 | 2.9 |
| 1-22 | 141.5 | 2900 | 1.8 | 6 × 10$^4$ | −5−+5 | 0.3 | 2.5 |
| 1-23 | 140.6 | 2900 | 1.6 | 5 × 10$^4$ | −5−+4 | 0.3 | 2.6 |
| 1-24 | 140.9 | 2900 | 1.8 | 4 × 10$^4$ | −3−+6 | 0.4 | 2.7 |
| 1-25 | 156.1 | 3200 | 1.8 | 5 × 10$^3$ | −7−+7 | 0.3 | 2.7 |
| 1-26 | 164.8 | 3400 | 1.8 | 5 × 10$^4$ | −9−+8 | 0.4 | 2.8 |
| 1-27 | 141.2 | 2900 | 1.5 | 7 × 10$^4$ | −5−+4 | 0.4 | 2.3 |
| 1-28 | 127.1 | 2600 | 1.9 | 7 × 10$^4$ | −13−+9 | 0.5 | 2.8 |

Samples marked with * lie outside the scope of the invention.

The dielectric ceramic compositions lying within the scope of the present invention all have dielectric constants which are as large as 2500 or more and satisfy X7R characteristics (change of the capacitance is within ±15% over a temperature range of from −55° C. to +125° C.) stipulated under the EIA Standards. Moreover, the compositions have dielectric losses tan δ which are as small as 2.5% or less and exhibit losses of not larger than 3.0% even under the application of an AC voltage of 2000 Vrms/cm. The compositions further have insulation resistances (IR) of more than 10$^4$ MΩ.

In Table 1, samples Nos. 1-1 to 1-4 are those in which Nb$_2$O$_5$ was added in an amount of from 0.7 to 2.5 parts by weight to BaTiO$_3$ that is the chief component of the dielectric ceramic compositions. In these cases, MgO, La$_2$O$_3$ and MnCO$_3$ were added in amounts of 0.2 parts by weight, 0.2 parts by weight and 0.1 part by weight, respectively.

In the sample No. 1-1 ($Nb_2O_5$ is added in an amount of 0.7 parts by weight), the dielectric constant εr is as good as 3500 but the dielectric loss tan δ becomes as large as 3.3%. Besides, the temperature characteristics become −27%. In the samples Nos. 1-2 to 1-4 ($Nb_2O_5$ is added in an amount of from 0.8 to 2.5 parts by weight), the dielectric constants εr are from 2700 to 3700, dielectric losses tan δ are not larger than 2.5%, temperature characteristics are within ±14%, tan δ are not larger than 2.8% when an AC voltage of 2000 V/cm is applied, and insulation resistances (IR) are from 3 to 9×10$^4$ MΩ, which are within favorable ranges. That is, the dielectric ceramic compositions have large dielectric constants εr, excellent temperature characteristics, small dielectric losses tan δ and small AC voltage dependence of dielectric loss.

In the samples Nos. 1-5 to 1-9, the amount of MgO to be added to $BaTiO_3$ which is the chief component of the dielectric ceramic compositions was changed to be from 0.05 to 0.75 parts by weight. In these cases, the amounts of $Nb_2O_5$, $La_2O_5$ and $MnCO_3$ were selected to be 0.8 to 2.5 parts by weight, 0.2 parts by weight and 0.1 part by weight, respectively.

In the sample No. 1-5 (MgO is contained in an amount of 0.05 parts by weight), tan δ becomes 4.0% when an AC voltage of 2000 V/cm is applied. In the samples Nos. 1-6 to 1-8 (MgO is added in an amount of from 0.06 to 0.70 parts by weight), the dielectric constants εr are from 2700 to 3100, dielectric losses tan δ are not larger than 2.0%, temperature characteristics are within ±13%, tan δ are not larger than 2.8% when an AC voltage of 2000 V/cm is applied, and insulation resistances (IR) are from 3 to 8×10$^4$ MΩ, which are within favorable ranges. That is, the dielectric ceramic compositions exhibit high dielectric constants εr, excellent temperature characteristics, small dielectric losses tan δ and small AC voltage dependence of dielectric loss. In the sample No. 1-9 (MgO is added in an amount of 0.75 parts by weight), the dielectric loss tan δ is as good as 1.7% but the dielectric constant εr is 2100. In the present invention, therefore, the amount of MgO to be added to the barium titanate $BaTiO_3$ is selected to be from 0.06 to 0.70 parts by weight per 100 parts by weight of the barium titanate $BaTiO_3$.

In the samples Nos. 1-10 to 1-14, the amount of $La_2O_3$ to be added to $BaTiO_3$ that is the chief component of the dielectric ceramic compositions was changed to be from 0.004 to 0.53 parts by weight. In these cases, the amounts of $Nb_2O_5$, MgO and $MnCO_3$ were selected to be 1.8 parts by weight, 0.3 parts by weight and 0.1 part by weight, respectively.

In the sample No. 1-10 ($La_2O_3$ is added in an amount of 0.004 parts by weight), the dielectric loss tan δ is 2.5% but the dielectric constant εr is as low as 2350. In the samples Nos. 1-11 to 1-13 ($La_2O_3$ is added in an amount of from 0.005 to 0.52 parts by weight), the dielectric constants εr are from 2800 to 3600, dielectric losses tan δ are not larger than 2.0%, temperature characteristics are within ±11%, tan δ are not larger than 2.8% when an AC voltage of 2000 V/cm is applied and insulation resistances (IR) are from 3 to 7×10$^4$ MΩ, which are within favorable ranges. That is, there are obtained dielectric ceramic compositions having high dielectric constants εr, excellent temperature characteristics, small dielectric losses tan δ and small AC voltage dependence of dielectric loss. In the sample No. 1-14 ($La_2O_3$ is added in an amount of 0.53 parts by weight), the dielectric constant εr is as large as 3800 and the dielectric loss tan δ is as small as 1.8%, but the temperature characteristics are deteriorated. According to the present invention, therefore, the amount of $La_2O_3$ to be added to the barium titanate $BaTiO_3$ is selected to be from 0.005 to 0.52 parts by weight per 100 parts by weight of the barium titanate $BaTiO_3$.

In the samples Nos. 1-15 to 1-19, the amount of $MnCO_3$ to be added to $BaTiO_3$ which is the chief component of the dielectric ceramic compositions was changed to be from 0.005 to 0.31 parts by weight. In these cases, the amounts of $Nb_2O_5$ MgO and $La_2O_3$ were selected to be 1.8 parts by weight, 0.3 parts by weight and 0.2 parts by weight.

In the sample No. 1-15 ($MnCO_3$ is added in an amount of 0.005 parts by weight), the dielectric constant εr is 3000 but the dielectric loss tan δ becomes 2.6%. Moreover, the insulation resistance is 9×10$^3$ MΩ. In the samples Nos. 1-16 to 1-18 ($MnCO_3$ is added in an amount of from 0.01 to 0.3 parts by weight), the dielectric constants εr are from 2800 to 3000, dielectric losses tan δ are not larger than 2.2%, temperature characteristics are within ±6%, tan δ are not larger than 3.0% when an AC voltage of 2000 V/cm is applied and insulation resistances (IR) are from 9×10$^4$ to 2×10$^5$ MΩ, which are within favorable ranges. That is, there are obtained dielectric ceramic compositions having large dielectric constants εr, excellent temperature characteristics, small dielectric losses tan δ and small AC voltage dependence of dielectric loss. In the sample No. 1-19 ($MnCO_3$ is added in an amount of 0.31 parts by weight), the dielectric loss tan δ is as small as 1.4% but the dielectric constant εr is as low as 2100. In the present invention, therefore, the amount of $MnCO_3$ to be added to the barium titanate $BaTiO_3$ is selected to be from 0.01 to 0.3 parts by weight per 100 parts by weight of the barium titanate $BaTiO_3$.

Example 2

To the composition of the sample No. 1-12 of Table 1 were added the powders of $SiO_2$, $Al_2O_3$ and ZnO in amounts as shown in Table 3. The mixture was then formed into a tape in the same manner as in Example 1. The tapes were stacked one upon the other and internal electrodes were formed to fabricate a laminate. Properties were measured in the same manner as in Example 1. The results were as shown in Table 4.

The sample possessed a composition comprising 1.8 parts by weight of $Nb_2O_5$, 0.3 parts by weight of MgO, 0.2 parts by weight of $La_2O_3$, 0.1 part by weight of MnO reckoned as $MnCO_3$, and $SiO_2$, $Al_2O_3$ and ZnO in predetermined amounts per 100 parts by weight of $BaTiO_3$.

TABLE 3

| Sample No. | $BaTiO_3$ pts. by wt. | $SiO_2$ pts. by wt. | $Al_2O_3$ pts. by wt. | ZnO pts. by wt. | Firing temp. (°C.) |
| --- | --- | --- | --- | --- | --- |
| 2-1 | 100 | 0.05 | — | — | 1260 |
| 2-2 | 100 | 0.1 | — | — | 1250 |
| 2-3 | 100 | 0.5 | — | — | 1230 |
| 2-4 | 100 | — | 0.05 | — | 1260 |
| 2-5 | 100 | — | 0.2 | — | 1250 |
| 2-6 | 100 | — | 0.5 | — | 1240 |
| 2-7 | 100 | 0.03 | 0.02 | — | 1260 |
| 2-8 | 100 | 0.2 | 0.3 | — | 1230 |
| 2-9 | 100 | — | — | 0.001 | 1270 |
| 2-10 | 100 | — | — | 0.01 | 1260 |
| 2-11 | 100 | — | — | 0.1 | 1250 |
| 2-12 | 100 | 0.1 | 0.1 | 0.001 | 1280 |
| 2-13 | 100 | 0.1 | 0.1 | 0.01 | 1250 |
| 2-14 | 100 | 0.1 | 0.1 | 0.1 | 1230 |

TABLE 4

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 2-1 | 151.3 | 3100 | 1.6 | $7 \times 10^4$ | −4−+6 | 0.4 | 2.3 |
| 2-2 | 152.5 | 3100 | 1.6 | $7 \times 10^4$ | −4−+6 | 0.4 | 2.3 |
| 2-3 | 160.4 | 3300 | 1.6 | $8 \times 10^4$ | −7−+8 | 0.4 | 2.3 |
| 2-4 | 146.2 | 3000 | 1.6 | $7 \times 10^4$ | −3−+6 | 0.4 | 2.4 |
| 2-5 | 150.3 | 3100 | 1.6 | $7 \times 10^4$ | −5−+6 | 0.4 | 2.3 |
| 2-6 | 154.3 | 3200 | 1.7 | $8 \times 10^4$ | −6−+7 | 0.4 | 2.3 |
| 2-7 | 147.2 | 3000 | 1.6 | $7 \times 10^4$ | −5−+6 | 0.4 | 2.4 |
| 2-8 | 154.8 | 3200 | 1.7 | $8 \times 10^4$ | −6−+7 | 0.4 | 2.3 |
| 2-9 | 152.0 | 3100 | 1.6 | $8 \times 10^4$ | −5−+6 | 0.4 | 2.5 |
| 2-10 | 155.3 | 3200 | 1.6 | $8 \times 10^4$ | −8−+9 | 0.4 | 2.6 |
| 2-11 | 165.2 | 3400 | 1.8 | $1 \times 10^5$ | −14−+15 | 0.4 | 3.0 |
| 2-12 | 155.3 | 3200 | 1.6 | $8 \times 10^4$ | −5−+6 | 0.4 | 2.4 |
| 2-13 | 160.1 | 3300 | 1.6 | $8 \times 10^4$ | −9−+9 | 0.4 | 2.5 |
| 2-14 | 181.1 | 3700 | 1.8 | $1 \times 10^5$ | −15−+14 | 0.4 | 2.8 |

It will be understood from these Tables 3 and 4 that with $SiO_2$, $Al_2O_3$ and ZnO being contained, the compositions are fired at temperatures lower than those of when these compounds are not contained (sample No. 1-12 of Table 1) and exhibit increased dielectric constants.

Example 3

A $BaTiO_3$ powder having an average particle diameter of not larger than 1.0 μm formed by the oxalic acid method was used as a chief component. Powders of $Nb_2O_5$, MgO, $Nd_2O_3$ and $MnCO_3$ were weighed as shown in Table 5 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other to prepare a laminate thereof.

TABLE 5

| Sample No. | $BaTiO_3$ pts. by wt | $Nb_2O_5$ pts. by wt. | MgO pts. by wt. | $Nd_2O_3$ pts. by wt. | $MnCO_3$ pts. by wt. | $Nb_2O_5$/MgO molar ratio | Firing temp. (°C.) |
|---|---|---|---|---|---|---|---|
| 3-*1 | 100 | 0.6 | 0.2 | 0.2 | 0.1 | 0.5 | 1340 |
| 3-2 | 100 | 0.8 | 0.2 | 0.2 | 0.1 | 0.6 | 1300 |
| 3-3 | 100 | 1.6 | 0.2 | 0.2 | 0.1 | 1.2 | 1280 |
| 3-4 | 100 | 2.5 | 0.2 | 0.2 | 0.1 | 2.0 | 1240 |
| 3-*5 | 100 | 0.8 | 0.04 | 0.2 | 0.1 | 3.0 | 1280 |
| 3-6 | 100 | 0.8 | 0.06 | 0.2 | 0.1 | 2.1 | 1280 |
| 3-7 | 100 | 2.3 | 0.3 | 0.2 | 0.1 | 1.2 | 1260 |
| 3-8 | 100 | 2.5 | 0.7 | 0.2 | 0.1 | 0.6 | 1240 |
| 3-*9 | 100 | 2.5 | 0.75 | 0.2 | 0.1 | 0.5 | 1240 |
| 3-*10 | 100 | 1.8 | 0.3 | 0 | 0.1 | 0.9 | 1340 |
| 3-11 | 100 | 1.8 | 0.3 | 0.005 | 0.1 | 0.9 | 1300 |
| 3-12 | 100 | 1.8 | 0.3 | 0.2 | 0.1 | 0.9 | 1260 |
| 3-13 | 100 | 1.8 | 0.3 | 0.52 | 0.1 | 0.9 | 1240 |
| 3-*14 | 100 | 1.8 | 0.3 | 0.55 | 0.1 | 0.9 | 1240 |
| 3-*15 | 100 | 1.8 | 0.3 | 0.2 | 0.005 | 0.9 | 1300 |
| 3-16 | 100 | 1.8 | 0.3 | 0.2 | 0.01 | 0.9 | 1280 |
| 3-17 | 100 | 1.8 | 0.3 | 0.2 | 0.05 | 0.9 | 1280 |
| 3-18 | 100 | 1.8 | 0.3 | 0.2 | 0.3 | 0.9 | 1260 |
| 3-*19 | 100 | 1.8 | 0.3 | 0.2 | 0.35 | 0.9 | 1260 |
| 3-*20 | 100 | 0.9 | 0.3 | 0.2 | 0.1 | 0.4 | 1280 |
| 3-*21 | 100 | 2.3 | 0.15 | 0.2 | 0.1 | 2.3 | 1240 |
| 3-22 | 100 | 2.0 | 0.4 | 0.2 | 0.1 | 0.8 | 1240 |
| 3-23 | 100 | 2.1 | 0.6 | 0.2 | 0.1 | 0.5 | 1260 |
| 3-24 | 100 | 1.8 | 0.3 | 0.1 | 0.1 | 0.9 | 1280 |
| 3-25 | 100 | 1.8 | 0.3 | 0.3 | 0.1 | 0.9 | 1260 |
| 3-26 | 100 | 1.8 | 0.3 | 0.4 | 0.1 | 0.9 | 1240 |
| 3-27 | 100 | 1.8 | 0.3 | 0.2 | 0.2 | 0.9 | 1280 |
| 3-28 | 100 | 1.4 | 0.1 | 0.2 | 0.1 | 2.2 | 1260 |

Samples marked with * lie outside the scope of the invention.

An Ag paste (Ag/Pd=30/70) was printed to form an internal electrode. The laminate was cut into 3.2 mm×1.6 mm and was fired in the air at 1240° to 1340° C. for two hours. Then, the electrodes of the silver paste were printed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms.

The change capacitance depending upon the temperature was measured over a range of from −55° to +125 °C., and the capacitance at +25° C. was used as a reference. The insulation resistance was measured at a moment after a DC voltage of 25 V was applied for one minute. The dielectric constant was calculated from the capacitance.

As for the average particle diameter of the sintered ceramic, the surface of the ceramic was observed using a scanning-type electron microscope at a magnification of 15000 times, and particles of not smaller than 500 were measured and calculated by the line intercepting method. Furthermore, the dielectric loss was measured by applying a voltage of 2000 Vrms/cm at a frequency of 1 KHz. The results were as shown in Table 6.

Besides, the temperature characteristics become −26%. In the samples Nos. 3-2 to 3-4 ($Nb_2O_5$ is added in an amount of from 0.8 to 2.5 parts by weight, the dielectric constants $\varepsilon r$ are from 2570 to 3500, dielectric losses tan δ are not larger than 2.5%, temperature characteristics are within ±14%, tan δ are not larger than 3.0% when an AC voltage of 2000 V/cm is applied, and insulation resistances (IR) are from 5 to $9 \times 10^4$ MΩ, which are within favorable ranges. That is, the dielectric ceramic compositions have large dielectric constants $\varepsilon r$, excellent temperature characteristics, small dielectric losses tan δ and small AC voltage dependence of dielectric loss.

In the samples Nos. 3-5 to 3-9, the amount of MgO to be added to $BaTiO_3$ which is the chief component of the

TABLE 6

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 3-*1 | 162.0 | 3330 | 3.2 | 8 × 10³ | −26−+3 | 0.8 | 4.4 |
| 3-2 | 171.1 | 3500 | 2.3 | 5 × 10⁴ | −14−+4 | 0.3 | 2.7 |
| 3-3 | 137.8 | 2850 | 1.5 | 8 × 10⁴ | −5−+6 | 0.4 | 2.4 |
| 3-4 | 124.2 | 2570 | 1.9 | 9 × 10⁴ | −12−+8 | 0.4 | 2.6 |
| 3-*5 | 108.2 | 2250 | 2.4 | 4 × 10³ | −20−+2 | 1.5 | 4.0 |
| 3-6 | 124.5 | 2580 | 2.0 | 3 × 10⁴ | −13−+7 | 0.5 | 2.6 |
| 3-7 | 133.3 | 2760 | 1.7 | 8 × 10⁴ | −7−+5 | 0.4 | 2.5 |
| 3-8 | 142.4 | 2950 | 1.6 | 3 × 10⁴ | −5−+4 | 0.3 | 2.5 |
| 3-*9 | 101.6 | 2100 | 1.7 | 7 × 10³ | −6−+2 | 0.4 | 2.6 |
| 3-*10 | 112.3 | 2350 | 2.5 | 7 × 10³ | −4−+16 | 0.5 | 3.1 |
| 3-11 | 130.0 | 2660 | 2.0 | 3 × 10⁴ | −4−+6 | 0.4 | 2.8 |
| 3-12 | 133.5 | 2760 | 1.6 | 7 × 10⁴ | −5−+7 | 0.4 | 2.4 |
| 3-13 | 165.4 | 3420 | 1.7 | 7 × 10⁴ | −11−+6 | 0.4 | 2.5 |
| 3-*14 | 176.0 | 3630 | 1.8 | 7 × 10⁴ | −20−+7 | 0.4 | 2.7 |
| 3-*15 | 137.5 | 2850 | 2.6 | 9 × 10³ | −5−+6 | 0.4 | 3.3 |
| 3-16 | 138.0 | 2860 | 2.2 | 3 × 10⁴ | −5−+6 | 0.4 | 3.0 |
| 3-17 | 134.0 | 2760 | 1.8 | 9 × 10⁴ | −5−+5 | 0.5 | 2.7 |
| 3-18 | 129.3 | 2650 | 1.4 | 1 × 10⁵ | −4−+4 | 0.9 | 2.2 |
| 3-*19 | 106.8 | 2200 | 1.4 | 9 × 10⁴ | −4−+3 | 0.9 | 2.2 |
| 3-*20 | 111.5 | 2310 | 2.7 | 3 × 10³ | −29−+4 | 0.5 | 3.8 |
| 3-*21 | 97.8 | 2030 | 2.3 | 7 × 10⁴ | −18−+11 | 0.6 | 2.9 |
| 3-22 | 134.4 | 2770 | 1.8 | 6 × 10⁴ | −5−+5 | 0.3 | 2.5 |
| 3-23 | 134.0 | 2750 | 1.5 | 5 × 10⁴ | −5−+4 | 0.3 | 2.6 |
| 3-24 | 134.1 | 2760 | 1.8 | 5 × 10⁴ | −3−+6 | 0.4 | 2.7 |
| 3-25 | 148.3 | 3050 | 1.7 | 5 × 10³ | −7−+7 | 0.3 | 2.7 |
| 3-26 | 156.6 | 3250 | 1.8 | 5 × 10⁴ | −9−+8 | 0.4 | 2.8 |
| 3-27 | 134.3 | 2770 | 1.5 | 7 × 10⁴ | −5−+4 | 0.4 | 2.3 |
| 3-28 | 122.5 | 2520 | 1.9 | 7 × 10⁴ | −13−+9 | 0.5 | 2.8 |

Samples marked with * lie outside the scope of the invention.

The dielectric ceramic compositions lying within the scope of the present invention all have dielectric constants which are as large as 2500 or more and satisfy X7R characteristics (change in the capacitance is within ±15% over a temperature range of from −55° C. to +125° C.) stipulated under the EIA Standards. Moreover, the dielectric ceramic compositions have dielectric losses tan δ which are as small as 2.5% or less and exhibit losses of not larger than 3.0% even under the application of an AC voltage of 2000 Vrms/cm. The compositions further have insulation resistances (IR) of not smaller than $10^4$ MΩ.

In Table 5, samples Nos. 3-1 to 3-4 are those in which $Nb_2O_5$ was added in an amount of from 0.6 to 2.5 parts by weight to $BaTiO_3$ that is the chief component of the dielectric ceramic compositions. In these cases, MgO, $Nd_2O_3$ and $MnCO_3$ were added in amounts of 0.2 parts by weight, 0.2 parts by weight and 0.1 part by weight, respectively.

In the sample No. 3-1 ($Nb_2O_5$ is added in an amount of 0.6 parts by weight), the dielectric constant εr is as good as 3330 but the dielectric loss tan δ becomes as large as 3.2%.

dielectric ceramic compositions was changed to be from 0.04 to 0.75 parts by weight. In these cases, the amounts of $Nb_2O_5$, $Nd_2O_3$ and $MnCO_3$ were selected to be 0.8 to 2.5 parts by weight, 0.2 parts by weight and 0.1 part by weight, respectively.

In the sample No. 3-5 (MgO is contained in an amount of 0.04 parts by weight), tan δ becomes 4.0% when an AC voltage of 2000 V/cm is applied. In the samples Nos. 3-6 to 3-8 (MgO is added in an amount of from 0.06 to 0.70 parts by weight), the dielectric constants εr are from 2580 to 2950, dielectric losses tan δ are not larger than 2.0%, temperature characteristics are within ±13%, tan δ are not larger than 2.6% when an AC voltage of 2000 V/cm is applied, and insulation resistances (IR) are from 3 to $8 \times 10^4$ MΩ, which are within favorable ranges. That is, the dielectric ceramic compositions exhibit large dielectric constants εr, excellent temperature characteristics, small dielectric losses tan δ and small AC voltage dependence of dielectric loss. In the sample No. 3-9 (MgO is added in an amount of 0.75 parts by weight), the dielectric loss tan δ is as good as 1.7% but the dielectric constant $\epsilon r$ is 2100. In the present invention, therefore, the amount of MgO to be added to the barium titanate $BaTiO_3$ is selected to be from 0.06 to 0.70 parts by weight per 100 parts by weight of the barium titanate $BaTiO_3$.

In the samples Nos. 3-10 to 3-14, the amount of $Nd_2O_3$ to be added to $BaTiO_3$ that is the chief component of the dielectric ceramic compositions was changed from 0 to 0.55 parts by weight. In these cases, the amounts of $Nb_2O_5$, MgO and $MnCO_3$ were selected to be 1.8 parts by weight, 0.3 parts by weight and 0.1 part by weight, respectively.

In the sample No. 3-10 (addition of $Nd_2O_3$ is 0), the dielectric loss tan $\delta$ is 2.5% but the dielectric constant $\epsilon r$ is as low as 2350. In the samples Nos. 3-11 to 3-13 ($Nd_2O_3$ is added in amounts of from 0.005 to 0.52 parts by weight), the dielectric constants $\epsilon r$ are from 2660 to 3420, dielectric losses tan $\delta$ are not larger than 2.0%, temperature characteristics are within ±11%, tan $\delta$ are not larger than 2.8% when an AC voltage of 2000 V/cm is applied and insulation resistances (IR) are from 3 to $7 \times 10^4$ M$\Omega$, which are within favorable ranges. That is, there are obtained dielectric ceramic compositions having high dielectric constants $\epsilon r$, excellent temperature characteristics, small dielectric losses tan $\delta$ and small AC voltage dependence of dielectric loss. In the sample No. 3-14 ($Nd_2O_3$ is added in an amount of 0.55 parts by weight), the dielectric constant $\epsilon r$ is as large as 3630 and the dielectric loss tan $\delta$ is as small as 1.8%, but the temperature characteristics are deteriorated. According to the present invention, therefore, the amount of $Nd_2O_3$ to be added to the barium titanate $BaTiO_3$ is selected to be from 0.005 to 0.52 parts by weight per 100 parts by weight of the barium titanate $BaTiO_3$.

In the samples Nos. 3-15 to 3-19, the amount of $MnCO_3$ to be added to $BaTiO_3$ which is the chief component of the dielectric ceramic compositions was changed from 0.005 to 0.35 parts by weight.

In these cases, the amounts of $Nb_2O_5$ MgO and $Nd_2O_3$ were selected to be 1.8 parts by weight, 0.3 parts by weight and 0.2 parts by weight.

In the sample No. 3-15 ($MnCO_3$ is added in an amount of 0.005 parts by weight), the dielectric constant $\epsilon r$ is 2850 but the dielectric loss tan $\delta$ becomes 2.6%. Moreover, the insulation resistance is $9 \times 10^3$ M$\Omega$. In the samples Nos. 3-16 to 3-18 ($MnCO_3$ is added in an amount of from 0.01 to 0.3 parts by weight), the dielectric constants $\epsilon r$ are from 2650 to 2860, dielectric losses tan $\delta$ are not larger than 2.2%, temperature characteristics are within ±6%, tan $\delta$ are not larger than 3.0% when an AC voltage of 2000 V/cm is applied and insulation resistances (IR) are from $3 \times 10^4$ to $1 \times 10^5$ M$\Omega$, which are within favorable ranges. That is, there are obtained dielectric ceramic compositions having large dielectric constants $\epsilon r$, excellent temperature characteristics, small dielectric losses tan $\delta$ and small AC voltage dependence of dielectric loss. In the sample No. 3-19 ($MnCO_3$ is added in an amount of 0.35 parts by weight), the dielectric loss tan $\delta$ is as small as 1.4% but the dielectric constant $\epsilon r$ is as low as 2200. In the present invention, therefore, the amount of $MnCO_3$ to be added to the barium titanate $BaTiO_3$ is selected to be from 0.01 to 0.3 parts by weight per 100 parts by weight of the barium titanate $BaTiO_3$.

In the samples Nos. 3-20 to 3-28, the ratio of MgO to $Nb_2O_5$ was changed to be from 0.4 to 2.2. When the ratio is as small as 0.4 or is as large as 2.3, the dielectric constants are 2310 and 2030 which are smaller than 2500. Temperature characteristics lie outside the range of the present invention, either. When the ratio is from 0.5 to 2.2, on the other hand, the dielectric constants are not smaller than 2500, and temperature characteristics and other properties become satisfactory.

Example 4

To the composition of the sample No. 3-12 of Table 5 were added the powders of $SiO_2$, $Al_2O_3$ and ZnO in amounts as shown in Table 7. The mixture was then formed into a tape in the same manner as in Example 3. The tapes were laminated one upon the other and internal electrodes were formed to fabricate a laminate. Properties were measured in the same manner as in Example 3. The results were as shown in Table 8.

The sample possessed a composition comprising 1.8 parts by weight of $Nb_2O_5$, 0.3 parts by weight of MgO, 0.2 parts by weight of $Nd_2O_3$, 0.1 part by weight of MnO reckoned as $MnCO_3$, and $SiO_2$, $Al_2O_3$ and ZnO in predetermined amounts per 100 parts by weight of $BaTiO_3$.

TABLE 7

| Sample No. | $BaTiO_3$ pts. by wt. | $SiO_2$ pts. by wt. | $Al_2O_3$ pts. by wt. | ZnO pts. by wt. | Firing temp. (°C.) |
|---|---|---|---|---|---|
| 4-1 | 100 | 0.05 | — | — | 1250 |
| 4-2 | 100 | 0.1 | — | — | 1230 |
| 4-3 | 100 | 0.5 | — | — | 1230 |
| 4-4 | 100 | — | 0.05 | — | 1250 |
| 4-5 | 100 | — | 0.2 | — | 1240 |
| 4-6 | 100 | — | 0.5 | — | 1230 |
| 4-7 | 100 | 0.03 | 0.02 | — | 1250 |
| 4-8 | 100 | 0.2 | 0.3 | — | 1230 |
| 4-9 | 100 | — | — | 0.001 | 1260 |
| 4-10 | 100 | — | — | 0.01 | 1250 |
| 4-11 | 100 | — | — | 0.1 | 1240 |
| 4-12 | 100 | 0.1 | 0.1 | 0.001 | 1240 |
| 4-13 | 100 | 0.1 | 0.1 | 0.01 | 1240 |
| 4-14 | 100 | 0.1 | 0.1 | 0.1 | 1230 |
| 4-15 | 100 | — | — | 0.3 | 1240 |
| 4-16 | 100 | — | — | 0.5 | 1240 |

TABLE 8

| Sample No. | Capacitance nF | Dielectric const. $\epsilon r$ | Dielectric loss tan $\delta$ (%) | Insulating resistance IR (M$\Omega$) | Temp. characteristics (%) | Particle diameter (μm) | Tan $\delta$ at 2000 V/cm (%) |
|---|---|---|---|---|---|---|---|
| 4-1 | 143.7 | 2950 | 1.6 | $7 \times 10^4$ | −4–+8 | 0.4 | 2.3 |
| 4-2 | 144.0 | 2980 | 1.6 | $7 \times 10^4$ | −3–+6 | 0.4 | 2.3 |
| 4-3 | 152.5 | 3140 | 1.7 | $8 \times 10^4$ | −7–+10 | 0.4 | 2.5 |
| 4-4 | 139.0 | 2850 | 1.6 | $7 \times 10^4$ | −4–+7 | 0.4 | 2.4 |
| 4-5 | 142.9 | 2940 | 1.7 | $7 \times 10^4$ | −5–+7 | 0.4 | 2.5 |
| 4-6 | 146.7 | 3100 | 1.8 | $8 \times 10^4$ | −5–+8 | 0.4 | 2.5 |

TABLE 8-continued

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 4-7 | 140.0 | 2860 | 1.6 | $7 \times 10^4$ | −4−+7 | 0.4 | 2.4 |
| 4-8 | 146.9 | 2960 | 1.8 | $8 \times 10^4$ | −6−+6 | 0.4 | 2.5 |
| 4-9 | 143.8 | 2970 | 1.6 | $8 \times 10^4$ | −5−+6 | 0.4 | 2.5 |
| 4-10 | 147.5 | 3040 | 1.8 | $8 \times 10^4$ | −7−+10 | 0.4 | 2.6 |
| 4-11 | 156.9 | 3230 | 1.9 | $1 \times 10^5$ | −10−+10 | 0.4 | 2.8 |
| 4-12 | 147.7 | 3050 | 1.6 | $8 \times 10^4$ | −5−+6 | 0.4 | 2.4 |
| 4-13 | 152.1 | 3150 | 1.7 | $8 \times 10^4$ | −9−+10 | 0.4 | 2.6 |
| 4-14 | 172.0 | 3510 | 2.0 | $1 \times 10^5$ | −14−+13 | 0.4 | 2.9 |
| 4-15 | 157.1 | 3250 | 2.0 | $8 \times 10^4$ | −11−+10 | 0.4 | 2.8 |
| 4-16 | 161.5 | 3360 | 2.0 | $8 \times 10^4$ | −13−+11 | 0.4 | 3.0 |

It will be understood from these Tables 7 and 8 that with $SiO_2$, $Al_2O_3$ and ZnO being contained, the compositions are fired at temperatures lower than those of when these compounds are not contained (sample No. 3-12 of Table 5) and exhibit increased dielectric constants.

Example 5

Laminates were prepared in the same manner as in Example 3 but using $Pr_6O_{11}$ instead of $Nd_2O_3$, and samples for measurement were obtained in the same manner as in Example 3 but effecting the firing in the air at 1230° to 1330° C. for two hours. The tested results of these samples were as shown in Tables 9 and 10.

TABLE 9

| Sample No. | $BaTiO_3$ pts. by wt. | $Nb_2O_5$ pts. by wt. | MgO pts. by wt. | $Pr_6O_{11}$ pts. by wt. | $MnCO_3$ pts. by wt. | $Nb_2O_5$/MgO molar ratio | Firing temp. (°C.) |
|---|---|---|---|---|---|---|---|
| 5-*1 | 100 | 0.7 | 0.2 | 0.2 | 0.1 | 0.5 | 1330 |
| 5-2 | 100 | 0.8 | 0.2 | 0.2 | 0.1 | 0.6 | 1300 |
| 5-3 | 100 | 1.6 | 0.2 | 0.2 | 0.1 | 1.2 | 1280 |
| 5-4 | 100 | 2.5 | 0.2 | 0.2 | 0.1 | 2.0 | 1240 |
| 5-*5 | 100 | 0.8 | 0.05 | 0.2 | 0.1 | 2.5 | 1280 |
| 5-6 | 100 | 0.8 | 0.06 | 0.2 | 0.1 | 2.1 | 1270 |
| 5-7 | 100 | 2.3 | 0.3 | 0.2 | 0.1 | 1.2 | 1250 |
| 5-8 | 100 | 2.5 | 0.7 | 0.2 | 0.1 | 0.6 | 1280 |
| 5-*9 | 100 | 2.5 | 0.75 | 0.2 | 0.1 | 0.5 | 1280 |
| 5-*10 | 100 | 1.8 | 0.3 | 0.004 | 0.1 | 0.9 | 1320 |
| 5-11 | 100 | 1.8 | 0.3 | 0.005 | 0.1 | 0.9 | 1300 |
| 5-12 | 100 | 1.8 | 0.3 | 0.2 | 0.1 | 0.9 | 1270 |
| 5-13 | 100 | 1.8 | 0.3 | 0.52 | 0.1 | 0.9 | 1250 |
| 5-*14 | 100 | 1.8 | 0.3 | 0.53 | 0.1 | 0.9 | 1250 |
| 5-*15 | 100 | 1.8 | 0.3 | 0.2 | 0.005 | 0.9 | 1300 |
| 5-16 | 100 | 1.8 | 0.3 | 0.2 | 0.01 | 0.9 | 1280 |
| 5-17 | 100 | 1.8 | 0.3 | 0.2 | 0.05 | 0.9 | 1280 |
| 5-18 | 100 | 1.8 | 0.3 | 0.2 | 0.3 | 0.9 | 1260 |
| 5-*19 | 100 | 1.8 | 0.3 | 0.2 | 0.40 | 0.9 | 1260 |
| 5-*20 | 100 | 0.9 | 0.3 | 0.2 | 0.1 | 0.4 | 1280 |
| 5-*21 | 100 | 2.3 | 0.15 | 0.2 | 0.1 | 2.3 | 1250 |
| 5-22 | 100 | 2.0 | 0.4 | 0.2 | 0.1 | 0.8 | 1250 |
| 5-23 | 100 | 2.1 | 0.6 | 0.2 | 0.1 | 0.5 | 1260 |
| 5-24 | 100 | 1.8 | 0.3 | 0.1 | 0.1 | 0.9 | 1280 |
| 5-25 | 100 | 1.8 | 0.3 | 0.3 | 0.1 | 0.9 | 1260 |
| 5-26 | 100 | 1.8 | 0.3 | 0.4 | 0.1 | 0.9 | 1250 |
| 5-27 | 100 | 1.8 | 0.3 | 0.2 | 0.2 | 0.9 | 1280 |
| 5-28 | 100 | 1.4 | 0.1 | 0.2 | 0.1 | 2.2 | 1260 |

Samples marked with * lie outside the scope of the invention.

TABLE 10

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 5-*1 | 168.1 | 3460 | 3.3 | $5 \times 10^4$ | −25−+3 | 0.5 | 4.4 |
| 5-2 | 178.8 | 3640 | 2.4 | $5 \times 10^4$ | −14−+8 | 0.4 | 2.8 |
| 5-3 | 141.4 | 2960 | 1.7 | $8 \times 10^4$ | −6−+6 | 0.5 | 2.5 |
| 5-4 | 129.0 | 2670 | 1.9 | $9 \times 10^4$ | −12−+8 | 0.5 | 2.7 |
| 5-*5 | 108.2 | 2350 | 2.4 | $4 \times 10^3$ | −19−+9 | 1.5 | 4.0 |
| 5-6 | 129.3 | 2660 | 2.1 | $3 \times 10^4$ | −13−+7 | 0.5 | 2.7 |
| 5-7 | 138.5 | 2870 | 1.8 | $8 \times 10^4$ | −6−+5 | 0.6 | 2.8 |
| 5-8 | 147.7 | 3050 | 1.6 | $3 \times 10^4$ | −5−+4 | 0.4 | 2.6 |
| 5-*9 | 111.6 | 2150 | 1.7 | $5 \times 10^3$ | −7−+2 | 0.4 | 2.7 |
| 5-*10 | 118.3 | 2410 | 2.5 | $2 \times 10^4$ | −4−+6 | 0.5 | 3.2 |
| 5-11 | 135.4 | 2760 | 2.0 | $5 \times 10^4$ | −5−+6 | 0.5 | 2.9 |
| 5-12 | 139.2 | 2870 | 1.6 | $7 \times 10^4$ | −5−+7 | 0.4 | 2.5 |
| 5-13 | 170.8 | 3560 | 1.7 | $7 \times 10^4$ | −11−+8 | 0.4 | 2.6 |
| 5-*14 | 181.5 | 3750 | 1.8 | $7 \times 10^4$ | −22−+5 | 0.4 | 2.7 |
| 5-*15 | 140.9 | 2960 | 2.6 | $8 \times 10^3$ | −7−+6 | 0.4 | 3.3 |
| 5-16 | 140.0 | 2920 | 2.2 | $3 \times 10^4$ | −5−+6 | 0.4 | 3.0 |
| 5-17 | 137.7 | 2870 | 1.8 | $8 \times 10^4$ | −6−+6 | 0.5 | 2.7 |
| 5-18 | 134.3 | 2640 | 1.5 | $1 \times 10^5$ | −5−+5 | 0.9 | 2.2 |
| 5-*19 | 106.0 | 2190 | 1.5 | $8 \times 10^4$ | −4−+6 | 0.9 | 2.3 |
| 5-*20 | 113.5 | 2310 | 2.7 | $3 \times 10^3$ | −28−+8 | 0.5 | 3.8 |
| 5-*21 | 104.5 | 2130 | 2.3 | $7 \times 10^4$ | −18−+12 | 0.6 | 2.9 |
| 5-22 | 139.0 | 2880 | 1.8 | $6 \times 10^4$ | −7−+6 | 0.3 | 2.6 |
| 5-23 | 137.9 | 2850 | 1.6 | $5 \times 10^4$ | −6−+4 | 0.3 | 2.6 |
| 5-24 | 138.5 | 2870 | 1.9 | $5 \times 10^4$ | −4−+8 | 0.4 | 2.8 |
| 5-25 | 153.3 | 3170 | 1.8 | $5 \times 10^3$ | −9−+7 | 0.3 | 2.8 |
| 5-26 | 160.6 | 3350 | 1.9 | $5 \times 10^4$ | −7−+8 | 0.4 | 2.8 |
| 5-27 | 138.3 | 2870 | 1.5 | $7 \times 10^4$ | −5−+9 | 0.4 | 2.3 |
| 5-28 | 126.5 | 2540 | 1.9 | $7 \times 10^4$ | −13−+4 | 0.5 | 2.8 |

Samples marked with * lie outside the scope of the invention.

The dielectric ceramic compositions lying within the scope of the present invention all have dielectric constants which are as large as 2500 or more and satisfy X7R characteristics (change in the capacitance is within ±15% over a temperature range of from −55° C. to +125° C.) stipulated under the EIA Standards. Moreover, the dielectric ceramic compositions have dielectric losses tan δ which are as small as 2.5% or less and exhibit losses of not larger than 3.0% even under the application of an AC voltage of 2000 Vrms/cm. The compositions further have insulation resistances (IR) of not smaller than $10^4$ MΩ.

Example 6

To the composition of the sample No. 5-12 of Table 9 were added the powders of $SiO_2$, $Al_2O_3$ and ZnO in amounts as shown in Table 11, and the mixture was formed into a tape. The tape was laminated, an internal electrode was formed, and a laminate was prepared. Properties were measured in the same manner as in Example 5. The results were as shown in Table 12.

The sample possessed a composition comprising 1.8 parts by weight of $Nb_2O_5$, 0.3 parts by weight of MgO, 0.2 parts by weight of $Pr_6O_{11}$, 0.1 part by weight of MnO reckoned as $MnCO_3$, and $SiO_2$, $Al_2O_3$ and ZnO in predetermined amounts per 100 parts by weight of $BaTiO_3$.

TABLE 11

| Sample No. | $BaTiO_3$ pts. by wt. | $SiO_2$ pts. by wt. | $Al_2O_3$ pts. by wt. | ZnO pts. by wt. | Firing temp. (°C.) |
|---|---|---|---|---|---|
| 6-1 | 100 | 0.05 | — | — | 1260 |
| 6-2 | 100 | 0.1 | — | — | 1250 |
| 6-3 | 100 | 0.5 | — | — | 1230 |
| 6-4 | 100 | — | 0.05 | — | 1260 |
| 6-5 | 100 | — | 0.2 | — | 1250 |
| 6-6 | 100 | — | 0.5 | — | 1240 |
| 6-7 | 100 | 0.03 | 0.02 | — | 1260 |
| 6-8 | 100 | 0.2 | 0.3 | — | 1230 |
| 6-9 | 100 | — | — | 0.001 | 1270 |
| 6-10 | 100 | — | — | 0.01 | 1260 |
| 6-11 | 100 | — | — | 0.1 | 1250 |
| 6-12 | 100 | 0.1 | 0.1 | 0.001 | 1260 |
| 6-13 | 100 | 0.1 | 0.1 | 0.01 | 1250 |
| 6-14 | 100 | 0.1 | 0.1 | 0.1 | 1230 |

TABLE 12

| Sample No. | Capacitance nF | Dielectric const. $\varepsilon_r$ | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 6-1 | 148.7 | 3050 | 1.7 | $7 \times 10^4$ | −6–+8 | 0.4 | 2.4 |
| 6-2 | 149.3 | 3080 | 1.6 | $7 \times 10^4$ | −7–+6 | 0.4 | 2.4 |
| 6-3 | 158.0 | 3240 | 1.8 | $8 \times 10^4$ | −9–+10 | 0.4 | 2.5 |
| 6-4 | 143.5 | 2950 | 1.6 | $7 \times 10^4$ | −4–+6 | 0.4 | 2.5 |
| 6-5 | 148.1 | 3040 | 1.7 | $7 \times 10^4$ | −4–+7 | 0.4 | 2.5 |
| 6-6 | 152.7 | 3160 | 1.8 | $8 \times 10^4$ | −6–+8 | 0.4 | 2.4 |
| 6-7 | 146.6 | 2960 | 1.6 | $7 \times 10^4$ | −5–+5 | 0.4 | 2.4 |
| 6-8 | 149.0 | 3060 | 1.8 | $8 \times 10^4$ | −4–+8 | 0.4 | 2.4 |
| 6-9 | 149.1 | 3070 | 1.7 | $8 \times 10^4$ | −9–+6 | 0.4 | 2.6 |
| 6-10 | 151.4 | 3140 | 1.8 | $8 \times 10^4$ | −8–+11 | 0.4 | 2.6 |
| 6-11 | 161.2 | 3330 | 1.9 | $1 \times 10^5$ | −14–+13 | 0.4 | 3.0 |
| 6-12 | 151.8 | 3150 | 1.6 | $8 \times 10^4$ | −8–+6 | 0.4 | 2.5 |
| 6-13 | 157.7 | 3250 | 1.7 | $8 \times 10^4$ | −9–+8 | 0.4 | 2.7 |
| 6-14 | 177.5 | 3610 | 2.0 | $1 \times 10^5$ | −14–+10 | 0.4 | 2.9 |

It will be understood from these Tables 11 and 12 that with $SiO_2$, $Al_2O_3$ and ZnO being contained, the compositions are fired at temperatures lower than those of when these compounds are not contained (sample No. 5-12) and exhibit increased dielectric constants.

TABLE 13

| Sample No. | $BaTiO_3$ pts. by wt | $Nb_2O_5$ pts. by wt. | MgO pts. by wt. | $Gd_2O_3$ pts. by wt. | $MnCO_3$ pts. by wt. | $Nb_2O_5$/MgO molar ratio | Firing temp. (°C.) |
|---|---|---|---|---|---|---|---|
| 7-*1 | 100 | 0.7 | 0.2 | 0.2 | 0.1 | 0.5 | 1310 |
| 7-2 | 100 | 0.8 | 0.2 | 0.2 | 0.1 | 0.6 | 1290 |
| 7-3 | 100 | 1.6 | 0.2 | 0.2 | 0.1 | 1.2 | 1270 |
| 7-4 | 100 | 2.5 | 0.2 | 0.2 | 0.1 | 2.0 | 1240 |
| 7-*5 | 100 | 0.8 | 0.05 | 0.2 | 0.1 | 2.5 | 1280 |
| 7-6 | 100 | 0.8 | 0.06 | 0.2 | 0.1 | 2.1 | 1270 |
| 7-7 | 100 | 2.3 | 0.3 | 0.2 | 0.1 | 1.2 | 1240 |
| 7-8 | 100 | 2.5 | 0.7 | 0.2 | 0.1 | 0.6 | 1280 |
| 7-*9 | 100 | 2.5 | 0.75 | 0.2 | 0.1 | 0.5 | 1280 |
| 7-*10 | 100 | 1.8 | 0.3 | 0.004 | 0.1 | 0.9 | 1320 |
| 7-11 | 100 | 1.8 | 0.3 | 0.005 | 0.1 | 0.9 | 1300 |
| 7-12 | 100 | 1.8 | 0.3 | 0.2 | 0.1 | 0.9 | 1260 |
| 7-13 | 100 | 1.8 | 0.3 | 0.52 | 0.1 | 0.9 | 1240 |
| 7-*14 | 100 | 1.8 | 0.3 | 0.53 | 0.1 | 0.9 | 1240 |
| 7-*15 | 100 | 1.8 | 0.3 | 0.2 | 0.005 | 0.9 | 1290 |
| 7-16 | 100 | 1.8 | 0.3 | 0.2 | 0.01 | 0.9 | 1270 |
| 7-17 | 100 | 1.8 | 0.3 | 0.2 | 0.05 | 0.9 | 1270 |
| 7-18 | 100 | 1.8 | 0.3 | 0.2 | 0.3 | 0.9 | 1250 |
| 7-*19 | 100 | 1.8 | 0.3 | 0.2 | 0.40 | 0.9 | 1250 |
| 7-*20 | 100 | 0.9 | 0.3 | 0.2 | 0.1 | 0.4 | 1270 |
| 7-*21 | 100 | 2.3 | 0.15 | 0.2 | 0.1 | 2.3 | 1240 |
| 7-22 | 100 | 2.0 | 0.4 | 0.2 | 0.1 | 0.8 | 1240 |
| 7-23 | 100 | 2.1 | 0.6 | 0.2 | 0.1 | 0.5 | 1250 |
| 7-24 | 100 | 1.8 | 0.3 | 0.1 | 0.1 | 0.9 | 1270 |
| 7-25 | 100 | 1.8 | 0.3 | 0.3 | 0.1 | 0.9 | 1250 |
| 7-26 | 100 | 1.8 | 0.3 | 0.4 | 0.1 | 0.9 | 1250 |
| 7-27 | 100 | 1.8 | 0.3 | 0.2 | 0.2 | 0.9 | 1270 |
| 7-28 | 100 | 1.4 | 0.1 | 0.2 | 0.1 | 2.2 | 1250 |

Samples marked with * lie outside the scope of the invention.

Example 7

A $BaTiO_3$ powder having an average particle diameter of not larger than 1.0 μm formed by the oxalic acid method was used as a chief component. Powders of $Nb_2O_5$, MgO, $Gd_2O_3$ and $MnCO_3$ were weighed as shown in Table 13 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other to prepare a laminate thereof.

An Ag paste (Ag/Pd=30/70) was printed to form an internal electrode. The laminate was cut into 3.2 mm×1.6 mm and was fired in the air at 1240° to 1320° C. for two hours. Then, the electrodes of the silver paste were printed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of not smaller than 500 were measured and calculated by the line intercepting method. Furthermore, the dielectric loss was measured by applying a voltage of 2000 Vrms/cm at a frequency of 1 KHz. The results were as shown in Table 14.

TABLE 14

| Sample No. | Capacitance nF | Dielectric const. $\varepsilon_r$ | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 7-*1 | 171.4 | 3530 | 3.0 | $6 \times 10^4$ | −22–+5 | 0.8 | 4.1 |
| 7-2 | 182.4 | 3710 | 2.2 | $6 \times 10^4$ | −13–+6 | 0.5 | 2.7 |
| 7-3 | 144.2 | 3020 | 1.6 | $8 \times 10^4$ | −7–+6 | 0.5 | 2.4 |
| 7-4 | 131.5 | 2720 | 1.8 | $9 \times 10^4$ | −12–+7 | 0.5 | 2.6 |
| 7-*5 | 110.4 | 2400 | 2.3 | $5 \times 10^3$ | −17–+9 | 1.5 | 4.0 |
| 7-6 | 131.9 | 2710 | 2.0 | $5 \times 10^4$ | −12–+7 | 0.6 | 2.6 |
| 7-7 | 141.2 | 2930 | 1.7 | $8 \times 10^4$ | −6–+6 | 0.6 | 2.5 |
| 7-8 | 150.6 | 3110 | 1.6 | $5 \times 10^4$ | −5–+6 | 0.4 | 2.6 |
| 7-*9 | 113.8 | 2190 | 1.6 | $5 \times 10^3$ | −7–+2 | 0.4 | 2.6 |
| 7-*10 | 120.6 | 2440 | 2.3 | $3 \times 10^4$ | −5–+6 | 0.5 | 3.1 |
| 7-11 | 138.1 | 2820 | 1.9 | $5 \times 10^4$ | −7–+6 | 0.5 | 2.8 |
| 7-12 | 142.0 | 2930 | 1.6 | $7 \times 10^4$ | −6–+7 | 0.4 | 2.5 |
| 7-13 | 174.8 | 3630 | 1.7 | $7 \times 10^4$ | −10–+8 | 0.4 | 2.6 |
| 7-*14 | 185.1 | 3820 | 1.7 | $7 \times 10^4$ | −20–+5 | 0.4 | 2.7 |
| 7-*15 | 143.7 | 3020 | 2.6 | $8 \times 10^3$ | −7–+6 | 0.4 | 3.2 |
| 7-16 | 142.8 | 2970 | 2.2 | $5 \times 10^4$ | −5–+8 | 0.4 | 2.9 |
| 7-17 | 140.4 | 2910 | 1.8 | $8 \times 10^4$ | −6–+8 | 0.5 | 2.6 |
| 7-18 | 134.2 | 2640 | 1.5 | $1 \times 10^5$ | −5–+7 | 0.7 | 2.3 |
| 7-*19 | 108.3 | 2230 | 1.5 | $8 \times 10^4$ | −4–+8 | 0.7 | 2.3 |
| 7-*20 | 115.8 | 2350 | 2.6 | $5 \times 10^3$ | −25–+8 | 0.5 | 3.7 |
| 7-*21 | 106.6 | 2170 | 2.2 | $7 \times 10^4$ | −18–+15 | 0.6 | 2.9 |
| 7-22 | 141.8 | 2940 | 1.7 | $6 \times 10^4$ | −7–+8 | 0.4 | 2.6 |
| 7-23 | 140.6 | 2900 | 1.6 | $5 \times 10^4$ | −6–+5 | 0.4 | 2.5 |
| 7-24 | 141.2 | 2930 | 1.8 | $5 \times 10^4$ | −4–+8 | 0.4 | 2.7 |
| 7-25 | 156.4 | 3230 | 1.7 | $5 \times 10^4$ | −9–+8 | 0.4 | 2.7 |
| 7-26 | 163.8 | 3410 | 1.8 | $5 \times 10^4$ | −7–+10 | 0.4 | 2.8 |
| 7-27 | 141.1 | 2930 | 1.5 | $7 \times 10^4$ | −5–+9 | 0.4 | 2.3 |
| 7-28 | 129.0 | 2590 | 1.8 | $7 \times 10^4$ | −12–+4 | 0.5 | 2.7 |

Samples marked with * lie outside the scope of the invention.

Example 8

To the composition of the sample No. 7-12 of Table 13 were added the powders of $SiO_2$, $Al_2O_3$ and ZnO in amounts as shown in Table 15, and the mixture was formed into a tape in the same manner as in Example 7. The tape was laminated, internal electrode was formed, and a laminate was prepared. Properties were measured in the same manner as in Example 7. The results were as shown in Table 16.

The sample possessed a composition comprising 1.8 parts by weight of $Nb_2O_5$, 0.3 parts by weight of MgO, 0.2 parts by weight of $Gd_2O_3$, 0.1 part by weight of MnO reckoned as $MnCO_3$, and $SiO_2$, $Al_2O_3$ and ZnO in predetermined amounts per 100 parts by weight of $BaTiO_3$.

TABLE 15

| Sample No. | $BaTiO_3$ pts. by wt. | $SiO_2$ pts. by wt. | $Al_2O_3$ pts. by wt. | ZnO pts. by wt. | Firing temp. (°C.) |
|---|---|---|---|---|---|
| 8-1 | 100 | 0.05 | — | — | 1250 |
| 8-2 | 100 | 0.1 | — | — | 1240 |
| 8-3 | 100 | 0.5 | — | — | 1230 |
| 8-4 | 100 | — | 0.05 | — | 1250 |
| 8-5 | 100 | — | 0.2 | — | 1240 |
| 8-6 | 100 | — | 0.5 | — | 1240 |
| 8-7 | 100 | 0.03 | 0.02 | — | 1250 |
| 8-8 | 100 | 0.2 | 0.3 | — | 1230 |
| 8-9 | 100 | — | — | 0.001 | 1260 |
| 8-10 | 100 | — | — | 0.01 | 1250 |
| 8-11 | 100 | — | — | 0.1 | 1240 |
| 8-12 | 100 | 0.1 | 0.1 | 0.001 | 1250 |
| 8-13 | 100 | 0.1 | 0.1 | 0.01 | 1240 |
| 8-14 | 100 | 0.1 | 0.1 | 0.1 | 1230 |

TABLE 16

| Sample No. | Capacitance nf | Dielectric const. εr | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 8-1 | 149.4 | 3060 | 1.6 | 7 × 10⁴ | −5−+8 | 0.4 | 2.5 |
| 8-2 | 150.0 | 3100 | 1.6 | 7 × 10⁴ | −6−+8 | 0.4 | 2.5 |
| 8-3 | 158.8 | 3250 | 1.7 | 8 × 10⁴ | −8−+10 | 0.4 | 2.6 |
| 8-4 | 144.2 | 2960 | 1.6 | 7 × 10⁴ | −3−+9 | 0.4 | 2.6 |
| 8-5 | 148.8 | 3050 | 1.6 | 7 × 10⁴ | −5−+7 | 0.4 | 2.5 |
| 8-6 | 153.4 | 3170 | 1.7 | 8 × 10⁴ | −5−+8 | 0.4 | 2.5 |
| 8-7 | 147.3 | 2980 | 1.6 | 7 × 10⁴ | −5−+9 | 0.4 | 2.5 |
| 8-8 | 149.7 | 3070 | 1.7 | 8 × 10⁴ | −4−+8 | 0.4 | 2.5 |
| 8-9 | 149.9 | 3080 | 1.6 | 8 × 10⁴ | −9−+7 | 0.4 | 2.6 |
| 8-10 | 152.1 | 3150 | 1.7 | 8 × 10⁴ | −8−+10 | 0.4 | 2.6 |
| 8-11 | 161.9 | 3340 | 1.8 | 1 × 10⁵ | −13−+10 | 0.4 | 2.9 |
| 8-12 | 152.6 | 3160 | 1.6 | 8 × 10⁴ | −8−+8 | 0.4 | 2.5 |
| 8-13 | 158.4 | 3260 | 1.7 | 8 × 10⁴ | −9−+6 | 0.4 | 2.7 |
| 8-14 | 178.3 | 3630 | 1.9 | 1 × 10⁵ | −13−+10 | 0.4 | 2.8 |

Example 9

A $BaTiO_3$ powder having an average particle diameter of not larger than 1.0 μm formed by the hydrothermal synthesizing method was used as a chief component. Powders of $Nb_2O_5$, MgO, $Tb_4O_7$ and $MnCO_3$ were weighed as shown in Table 17 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other to prepare a laminate thereof.

TABLE 17

| Sample No. | BaTiO₃ pts. by wt. | Nb₂O₅ pts. by wt. | MgO pts. by wt. | Tb₄O₇ pts. by wt. | MnCO₃ pts. by wt. | Nb₂O₅/ MgO molar ratio | Firing temp. (°C.) |
|---|---|---|---|---|---|---|---|
| 9-1 | 100 | 0.6 | 0.2 | 0.2 | 0.1 | 0.5 | 1320 |
| 9-2 | 100 | 0.8 | 0.2 | 0.2 | 0.1 | 0.6 | 1290 |
| 9-3 | 100 | 1.6 | 0.2 | 0.2 | 0.1 | 1.2 | 1280 |
| 9-4 | 100 | 2.5 | 0.2 | 0.2 | 0.1 | 2.0 | 1250 |
| 9-*5 | 100 | 0.8 | 0.05 | 0.2 | 0.1 | 2.5 | 1280 |
| 9-6 | 100 | 0.8 | 0.06 | 0.2 | 0.1 | 2.1 | 1280 |
| 9-7 | 100 | 2.3 | 0.3 | 0.2 | 0.1 | 1.2 | 1250 |
| 9-8 | 100 | 2.5 | 0.7 | 0.2 | 0.1 | 0.6 | 1280 |
| 9-*9 | 100 | 2.5 | 0.75 | 0.2 | 0.1 | 0.5 | 1280 |
| 9-*10 | 100 | 1.8 | 0.3 | 0.002 | 0.1 | 0.9 | 1340 |
| 9-11 | 100 | 1.8 | 0.3 | 0.005 | 0.1 | 0.9 | 1300 |
| 9-12 | 100 | 1.8 | 0.3 | 0.2 | 0.1 | 0.9 | 1280 |
| 9-13 | 100 | 1.8 | 0.3 | 0.52 | 0.1 | 0.9 | 1250 |
| 9-*14 | 100 | 1.8 | 0.3 | 0.53 | 0.1 | 0.9 | 1250 |
| 9-*15 | 100 | 1.8 | 0.3 | 0.2 | 0.005 | 0.9 | 1290 |
| 9-16 | 100 | 1.8 | 0.3 | 0.2 | 0.01 | 0.9 | 1270 |
| 9-17 | 100 | 1.8 | 0.3 | 0.2 | 0.05 | 0.9 | 1270 |
| 9-18 | 100 | 1.8 | 0.3 | 0.2 | 0.3 | 0.9 | 1260 |
| 9-*19 | 100 | 1.8 | 0.3 | 0.2 | 0.40 | 0.9 | 1260 |
| 9-*20 | 100 | 0.9 | 0.3 | 0.2 | 0.1 | 0.4 | 1280 |
| 9-*21 | 100 | 2.3 | 0.15 | 0.2 | 0.1 | 2.3 | 1250 |
| 9-22 | 100 | 2.0 | 0.4 | 0.2 | 0.1 | 0.8 | 1250 |
| 9-23 | 100 | 2.1 | 0.6 | 0.2 | 0.1 | 0.5 | 1260 |
| 9-24 | 100 | 1.8 | 0.3 | 0.1 | 0.1 | 0.9 | 1280 |
| 9-25 | 100 | 1.8 | 0.3 | 0.3 | 0.1 | 0.9 | 1260 |
| 9-26 | 100 | 1.8 | 0.3 | 0.4 | 0.1 | 0.9 | 1260 |
| 9-27 | 100 | 1.8 | 0.3 | 0.2 | 0.2 | 0.9 | 1280 |
| 9-28 | 100 | 1.4 | 0.1 | 0.2 | 0.1 | 2.2 | 1260 |

Samples marked with * lie outside the scope of the invention.

An Ag paste (Ag/Pd=30/70) was printed to form an internal electrode. The laminate was cut into 3.2 mm×1.6 mm and was fired in the air at 1250° to 1340° C. for two hours as shown in Table 17. Then, the electrodes of the silver paste were printed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of not smaller than 500 were measured and calculated by the line intercepting method. Furthermore, the dielectric loss was measured by applying a voltage of 2000 Vrms/cm at a frequency of 1 KHz. The results were as shown in Table 18.

TABLE 18

| Sample No. | Capacitance nf | Dielectric const. εr | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 9-*1 | 179.9 | 3710 | 3.6 | 6 × 10³ | −20−+5 | 1.5 | 4.5 |
| 9-2 | 178.8 | 3640 | 2.2 | 6 × 10⁴ | −13−+5 | 0.5 | 2.7 |
| 9-3 | 141.3 | 2960 | 1.7 | 8 × 10⁴ | −8−+6 | 0.5 | 2.5 |
| 9-4 | 128.9 | 2670 | 1.9 | 8 × 10⁴ | −11−+8 | 0.5 | 2.7 |
| 9-*5 | 108.2 | 2350 | 2.5 | 5 × 10³ | −17−+11 | 0.8 | 4.0 |
| 9-6 | 129.3 | 2660 | 2.0 | 6 × 10⁴ | −12−+7 | 0.6 | 2.7 |
| 9-7 | 138.4 | 2870 | 1.7 | 8 × 10⁴ | −6−+8 | 0.5 | 2.5 |
| 9-8 | 147.6 | 3050 | 1.7 | 6 × 10⁴ | −9−+6 | 0.4 | 2.7 |
| 9-*9 | 111.5 | 2150 | 1.9 | 5 × 10³ | −7−+2 | 0.4 | 2.7 |
| 9-*10 | 120.0 | 2420 | 2.3 | 5 × 10⁴ | −7−+6 | 0.5 | 3.3 |
| 9-11 | 135.1 | 2760 | 1.8 | 5 × 10⁴ | −5−+10 | 0.5 | 2.8 |
| 9-12 | 139.1 | 2870 | 1.6 | 8 × 10⁴ | −6−+7 | 0.4 | 2.5 |
| 9-13 | 173.1 | 3590 | 1.7 | 6 × 10⁴ | −9−+8 | 0.4 | 2.6 |
| 9-*14 | 181.4 | 3740 | 1.8 | 8 × 10⁴ | −20−+6 | 0.4 | 2.8 |
| 9-*15 | 142.3 | 2990 | 2.7 | 8 × 10³ | −10−+6 | 0.4 | 3.3 |
| 9-16 | 139.9 | 2910 | 2.1 | 6 × 10⁴ | −5−+8 | 0.4 | 2.8 |
| 9-17 | 137.6 | 2850 | 1.8 | 8 × 10⁴ | −6−+4 | 0.5 | 2.6 |
| 9-18 | 131.5 | 2590 | 1.7 | 8 × 10⁴ | −5−+7 | 0.6 | 2.5 |
| 9-*19 | 106.1 | 2160 | 1.6 | 8 × 10⁴ | −4−+8 | 0.6 | 2.5 |
| 9-*20 | 113.5 | 2300 | 2.6 | 5 × 10³ | −22−+6 | 0.5 | 3.7 |
| 9-*21 | 106.2 | 2140 | 2.2 | 6 × 10⁴ | −16−+12 | 0.6 | 2.9 |
| 9-22 | 138.9 | 2880 | 1.7 | 6 × 10⁴ | −7−+8 | 0.4 | 2.7 |
| 9-23 | 137.8 | 2840 | 1.6 | 5 × 10⁴ | −5−+6 | 0.4 | 2.6 |
| 9-24 | 138.4 | 2870 | 1.8 | 5 × 10⁴ | −8−+4 | 0.4 | 2.7 |
| 9-25 | 153.2 | 3170 | 1.7 | 6 × 10⁴ | −5−+8 | 0.4 | 2.7 |
| 9-26 | 160.5 | 3340 | 1.9 | 6 × 10⁴ | −7−+6 | 0.4 | 2.8 |
| 9-27 | 138.3 | 2870 | 1.6 | 8 × 10⁴ | −9−+6 | 0.4 | 2.5 |
| 9-28 | 129.0 | 2590 | 1.8 | 6 × 10⁴ | −10−+6 | 0.5 | 2.8 |

Samples marked with * lie outside the scope of the invention.

Example 10

To the composition of the sample No. 9-12 of Table 17 were added the powders of $SiO_2$, $Al_2O_3$ and ZnO in amounts as shown in Table 19, and the mixture was formed into a tape in the same manner as in Example 9. The tape was laminated, an internal electrode was formed, and a laminate was prepared. Properties were measured in the same manner as in Example 9. The results were as shown in Table 20.

The sample possessed a composition comprising 1.8 parts by weight of $Nb_2O_5$, 0.3 parts by weight of MgO, 0.2 parts by weight of $Tb_4O_7$, 0.1 part by weight of MnO reckoned as MnCO$_3$, and SiO$_2$, Al$_2$O$_3$ and ZnO in predetermined amounts per 100 parts by weight of BaTiO$_3$.

TABLE 19

| Sample No. | BaTiO$_3$ pts. by wt. | SiO$_2$ pts. by wt. | Al$_2$O$_3$ pts. by wt. | ZnO pts. by wt. | Firing temp. (°C.) |
|---|---|---|---|---|---|
| 10-1 | 100 | 0.05 | — | — | 1260 |
| 10-2 | 100 | 0.1 | — | — | 1250 |
| 10-3 | 100 | 0.5 | — | — | 1250 |
| 10-4 | 100 | — | 0.05 | — | 1260 |
| 10-5 | 100 | — | 0.2 | — | 1250 |
| 10-6 | 100 | — | 0.5 | — | 1250 |
| 10-7 | 100 | 0.03 | 0.02 | — | 1260 |
| 10-8 | 100 | 0.2 | 0.3 | — | 1250 |
| 10-9 | 100 | — | — | 0.001 | 1260 |
| 10-10 | 100 | — | — | 0.01 | 1260 |
| 10-11 | 100 | — | — | 0.5 | 1250 |
| 10-12 | 100 | 0.1 | 0.1 | 0.001 | 1260 |
| 10-13 | 100 | 0.1 | 0.1 | 0.01 | 1250 |
| 10-14 | 100 | 0.1 | 0.1 | 0.1 | 1250 |

TABLE 20

| Sample No. | Capacitance nf | Dielectric const. ε r | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 10-1 | 148.4 | 3000 | 1.7 | 7 × 10$^4$ | −7→+6 | 0.6 | 2.6 |
| 10-2 | 147.0 | 3040 | 1.7 | 7 × 10$^4$ | −8→+5 | 0.4 | 2.6 |
| 10-3 | 155.6 | 3190 | 1.8 | 8 × 10$^4$ | −8→+6 | 0.4 | 2.7 |
| 10-4 | 141.3 | 2900 | 1.7 | 7 × 10$^4$ | −5→+7 | 0.4 | 2.6 |
| 10-5 | 145.8 | 2990 | 1.6 | 7 × 10$^4$ | −5→+7 | 0.4 | 2.6 |
| 10-6 | 150.3 | 3110 | 1.7 | 8 × 10$^4$ | −7→+8 | 0.4 | 2.6 |
| 10-7 | 144.3 | 2920 | 1.6 | 7 × 10$^4$ | −6→+4 | 0.4 | 2.6 |
| 10-8 | 146.7 | 3010 | 1.7 | 8 × 10$^4$ | −5→+8 | 0.4 | 2.6 |
| 10-9 | 146.9 | 3020 | 1.6 | 8 × 10$^4$ | −8→+8 | 0.4 | 2.6 |
| 10-10 | 149.1 | 3090 | 1.8 | 8 × 10$^4$ | −5→+10 | 0.4 | 2.7 |
| 10-11 | 158.7 | 3270 | 1.8 | 8 × 10$^4$ | −10→+6 | 0.4 | 2.8 |
| 10-12 | 149.5 | 3100 | 1.7 | 8 × 10$^4$ | −6→+8 | 0.4 | 2.6 |
| 10-13 | 155.3 | 3190 | 1.7 | 8 × 10$^4$ | −7→+6 | 0.4 | 2.7 |
| 10-14 | 174.7 | 3560 | 1.9 | 8 × 10$^4$ | −11→+8 | 0.4 | 2.8 |

Example 11

Laminates were prepared in the same manner as in Example 9 but using Sm$_2$O$_3$ instead of Tb$_4$O$_7$, and samples for measurement were obtained in the same manner as in Example 9 but effecting the firing in the air at 1260° to 1340° C. for two hours. The samples and the tested results were as shown in Tables 21 and 22.

TABLE 21

| Sample No. | BaTiO$_3$ pts. by wt. | Nb$_2$O$_5$ pts. by wt. | MgO pts. by wt. | Sm$_2$O$_3$ pts. by wt. | MnCO$_3$ pts. by wt. | Nb$_2$O$_5$/MgO molar ratio | Firing temp. (°C.) |
|---|---|---|---|---|---|---|---|
| 11-*1 | 100 | 0.6 | 0.2 | 0.2 | 0.1 | 0.5 | 1340 |
| 11-2 | 100 | 0.8 | 0.2 | 0.2 | 0.1 | 0.6 | 1300 |
| 11-3 | 100 | 1.6 | 0.2 | 0.2 | 0.1 | 1.2 | 1280 |
| 11-4 | 100 | 2.5 | 0.2 | 0.2 | 0.1 | 2.0 | 1260 |
| 11-*5 | 100 | 0.8 | 0.05 | 0.2 | 0.1 | 2.5 | 1300 |
| 11-6 | 100 | 0.8 | 0.06 | 0.2 | 0.1 | 2.1 | 1300 |
| 11-7 | 100 | 2.3 | 0.3 | 0.2 | 0.1 | 1.2 | 1260 |
| 11-8 | 100 | 2.5 | 0.7 | 0.2 | 0.1 | 0.6 | 1280 |
| 11-*9 | 100 | 2.5 | 0.75 | 0.2 | 0.1 | 0.5 | 1280 |
| 11-*10 | 100 | 1.8 | 0.3 | 0.002 | 0.1 | 0.9 | 1340 |
| 11-11 | 100 | 1.8 | 0.3 | 0.005 | 0.1 | 0.9 | 1300 |
| 11-12 | 100 | 1.8 | 0.3 | 0.2 | 0.1 | 0.9 | 1280 |
| 11-13 | 100 | 1.8 | 0.3 | 0.52 | 0.1 | 0.9 | 1260 |
| 11-*14 | 100 | 1.8 | 0.3 | 0.53 | 0.1 | 0.9 | 1260 |
| 11-*15 | 100 | 1.8 | 0.3 | 0.2 | 0.005 | 0.9 | 1290 |
| 11-16 | 100 | 1.8 | 0.3 | 0.2 | 0.01 | 0.9 | 1280 |
| 11-17 | 100 | 1.8 | 0.3 | 0.2 | 0.05 | 0.9 | 1280 |
| 11-18 | 100 | 1.8 | 0.3 | 0.2 | 0.3 | 0.9 | 1260 |
| 11-*19 | 100 | 1.8 | 0.3 | 0.2 | 0.4 | 0.9 | 1260 |
| 11-*20 | 100 | 0.9 | 0.3 | 0.2 | 0.1 | 0.4 | 1280 |
| 11-*21 | 100 | 2.3 | 0.15 | 0.2 | 0.1 | 2.3 | 1260 |
| 11-22 | 100 | 2.0 | 0.4 | 0.2 | 0.1 | 0.8 | 1260 |
| 11-23 | 100 | 2.1 | 0.6 | 0.2 | 0.1 | 0.5 | 1260 |
| 11-24 | 100 | 1.8 | 0.3 | 0.1 | 0.1 | 0.9 | 1280 |
| 11-25 | 100 | 1.8 | 0.3 | 0.3 | 0.1 | 0.9 | 1260 |
| 11-26 | 100 | 1.8 | 0.3 | 0.4 | 0.1 | 0.9 | 1260 |
| 11-27 | 100 | 1.8 | 0.3 | 0.2 | 0.2 | 0.9 | 1280 |
| 11-28 | 100 | 1.4 | 0.1 | 0.2 | 0.1 | 2.2 | 1260 |

Samples marked with * lie outside the scope of the invention.

TABLE 22

| Sample No. | Capacitance nf | Dielectric const. ε r | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 11-*1 | 181.4 | 3710 | 3.5 | 6 × 10$^3$ | −18→+5 | 1.8 | 5.1 |
| 11-2 | 173.4 | 3520 | 2.1 | 6 × 10$^4$ | −11→+6 | 0.5 | 2.8 |
| 11-3 | 137.0 | 2860 | 1.5 | 6 × 10$^4$ | −7→+6 | 0.5 | 2.5 |
| 11-4 | 125.0 | 2590 | 1.7 | 8 × 10$^4$ | −12→+7 | 0.5 | 2.6 |
| 11-*5 | 108.3 | 2350 | 2.8 | 5 × 10$^3$ | −17→+6 | 1.5 | 4.4 |
| 11-6 | 129.3 | 2660 | 1.8 | 6 × 10$^4$ | −12→+3 | 0.6 | 2.6 |
| 11-7 | 134.2 | 2780 | 1.7 | 8 × 10$^4$ | −6→+6 | 0.5 | 2.5 |
| 11-8 | 143.1 | 2950 | 1.7 | 6 × 10$^4$ | −8→+6 | 0.4 | 2.6 |
| 11-*9 | 113.8 | 2190 | 1.6 | 5 × 10$^3$ | −7→+9 | 0.4 | 2.8 |
| 11-*10 | 114.6 | 2330 | 2.3 | 3 × 10$^4$ | −5→+6 | 0.5 | 3.1 |
| 11-11 | 131.3 | 2680 | 1.9 | 5 × 10$^4$ | −10→+6 | 0.5 | 2.8 |
| 11-12 | 135.0 | 2780 | 1.7 | 8 × 10$^4$ | −6→+7 | 0.4 | 2.6 |
| 11-13 | 166.1 | 3450 | 1.8 | 8 × 10$^4$ | −10→+8 | 0.4 | 2.8 |
| 11-*14 | 175.8 | 3630 | 1.8 | 6 × 10$^4$ | −20→+5 | 0.4 | 2.8 |
| 11-*15 | 136.5 | 2870 | 2.8 | 8 × 10$^3$ | −10→+6 | 0.4 | 3.2 |
| 11-16 | 135.7 | 2820 | 2.2 | 6 × 10$^4$ | −7→+8 | 0.4 | 2.9 |
| 11-17 | 133.4 | 2760 | 1.8 | 8 × 10$^4$ | −9→+5 | 0.5 | 2.6 |
| 11-18 | 127.5 | 2520 | 1.7 | 8 × 10$^4$ | −5→+7 | 0.5 | 2.5 |
| 11-*19 | 106.5 | 2190 | 1.6 | 8 × 10$^4$ | −4→+8 | 0.6 | 2.3 |
| 11-*20 | 113.5 | 2300 | 2.8 | 5 × 10$^3$ | −25→+8 | 0.5 | 3.9 |
| 11-*21 | 107.6 | 2210 | 2.2 | 6 × 10$^4$ | −18→+6 | 0.6 | 2.9 |
| 11-22 | 134.7 | 2790 | 1.7 | 8 × 10$^4$ | −7→+6 | 0.4 | 2.6 |
| 11-23 | 133.6 | 2750 | 1.7 | 5 × 10$^4$ | −6→+5 | 0.4 | 2.6 |
| 11-24 | 134.3 | 2780 | 1.9 | 5 × 10$^4$ | −4→+8 | 0.4 | 2.7 |
| 11-25 | 148.6 | 3080 | 1.8 | 6 × 10$^4$ | −7→+8 | 0.4 | 2.6 |
| 11-26 | 155.6 | 3240 | 1.8 | 6 × 10$^4$ | −6→+10 | 0.4 | 2.7 |
| 11-27 | 134.0 | 2780 | 1.7 | 8 × 10$^4$ | −7→+8 | 0.4 | 2.5 |
| 11-28 | 122.6 | 2500 | 1.8 | 8 × 10$^4$ | −12→+6 | 0.5 | 2.7 |

Samples marked with * lie outside the scope of the invention.

Example 12

To the composition of the sample No. 11-12 of Table 21 were added the powders of SiO$_2$, Al$_2$O$_3$ and ZnO in amounts as shown in Table 23, and the mixture was formed into a tape in the same manner as in Example 11. The tape was laminated, an internal electrode was formed, and a laminate was prepared. Properties were measured in the same manner as in Example 11. The results were as shown in Table 24.

The sample possessed a composition comprising 1.8 parts by weight of Nb$_2$O$_5$, 0.3 parts by weight of MgO, 0.2 parts by weight of Sm$_2$O$_3$, 0.1 part by weight of MnO reckoned as MnCO$_3$, and SiO$_2$, Al$_2$O$_3$ and ZnO in predetermined amounts per 100 parts by weight of BaTiO$_3$.

TABLE 23

| Sample No. | BaTiO$_3$ pts. by wt. | SiO$_2$ pts. by wt. | Al$_2$O$_3$ pts. by wt. | ZnO pts. by wt. | Firing temp. (°C.) |
|---|---|---|---|---|---|
| 12-1 | 100 | 0.05 | — | — | 1270 |
| 12-2 | 100 | 0.1 | — | — | 1260 |
| 12-3 | 100 | 0.5 | — | — | 1250 |
| 12-4 | 100 | — | 0.05 | — | 1270 |
| 12-5 | 100 | — | 0.2 | — | 1260 |
| 12-6 | 100 | — | 0.5 | — | 1250 |
| 12-7 | 100 | 0.03 | 0.02 | — | 1260 |
| 12-8 | 100 | 0.2 | 0.3 | — | 1250 |
| 12-9 | 100 | — | — | 0.001 | 1270 |
| 12-10 | 100 | — | — | 0.01 | 1260 |
| 12-11 | 100 | — | — | 0.5 | 1260 |
| 12-12 | 100 | 0.1 | 0.1 | 0.001 | 1260 |
| 12-13 | 100 | 0.1 | 0.1 | 0.01 | 1250 |
| 12-14 | 100 | 0.1 | 0.1 | 0.1 | 1250 |

TABLE 24

| Sample No. | Capacitance nf | Dielectric const. εr | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 12-1 | 144.9 | 2970 | 1.7 | 8 × 10$^4$ | −5–+10 | 0.4 | 2.6 |
| 12-2 | 145.5 | 3010 | 1.7 | 8 × 10$^4$ | −6–+7 | 0.4 | 2.6 |
| 12-3 | 153.6 | 3150 | 1.8 | 8 × 10$^4$ | −8–+10 | 0.4 | 2.7 |
| 12-4 | 139.9 | 2870 | 1.7 | 8 × 10$^4$ | −3–+9 | 0.4 | 2.7 |
| 12-5 | 144.3 | 2960 | 1.7 | 8 × 10$^4$ | −5–+7 | 0.4 | 2.6 |
| 12-6 | 148.8 | 3080 | 1.7 | 8 × 10$^4$ | −4–+8 | 0.4 | 2.6 |
| 12-7 | 142.9 | 2890 | 1.7 | 8 × 10$^4$ | −5–+9 | 0.4 | 2.6 |
| 12-8 | 145.2 | 2990 | 1.7 | 8 × 10$^4$ | −4–+8 | 0.4 | 2.6 |
| 12-9 | 145.4 | 3000 | 1.6 | 8 × 10$^4$ | −9–+7 | 0.4 | 2.6 |
| 12-10 | 147.5 | 3060 | 1.7 | 8 × 10$^4$ | −8–+10 | 0.4 | 2.6 |
| 12-11 | 157.0 | 3240 | 1.8 | 1 × 10$^5$ | −12–+10 | 0.4 | 2.8 |
| 12-12 | 148.4 | 3070 | 1.6 | 8 × 10$^4$ | −6–+8 | 0.4 | 2.5 |
| 12-13 | 153.6 | 3160 | 1.7 | 8 × 10$^4$ | −8–+6 | 0.4 | 2.7 |
| 12-14 | 172.9 | 3520 | 1.8 | 1 × 10$^5$ | −12–+8 | 0.4 | 2.8 |

Example 13

A BaTiO$_3$ powder having an average particle diameter of not larger than 1.0 μm formed by the oxalic acid method was used as a chief component. Powders of Ta$_2$O$_5$, MgO, La$_2$O$_3$, MnCO$_3$, SiO$_2$, Al$_2$O$_3$ and ZnO were weighed as shown in Table 25 with respect to 100 parts by weight of BaTiO$_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other to prepare a laminate thereof.

TABLE 25

| Sample No. | BaTiO$_3$ pts. by wt. | Ta$_2$O$_5$ pts. by wt. | MgO pts. by wt. | La$_2$O$_3$ pts. by wt. | MnCO$_3$ pts. by wt. | Nb$_2$O$_5$/MgO molar ratio | Firing temp. (°C.) |
|---|---|---|---|---|---|---|---|
| 13-1 | 100 | 1.3 | 0.2 | 0.2 | 0.1 | 0.6 | 1280 |
| 13-2 | 100 | 2.4 | 0.2 | 0.2 | 0.1 | 1.1 | 1270 |
| 13-3 | 100 | 3.5 | 0.2 | 0.2 | 0.1 | 1.6 | 1250 |
| 13-*4 | 100 | 3.6 | 0.2 | 0.2 | 0.1 | 1.6 | 1250 |
| 13-*5 | 100 | 1.3 | 0.05 | 0.2 | 0.1 | 2.4 | 1280 |
| 13-6 | 100 | 1.3 | 0.06 | 0.2 | 0.1 | 2.0 | 1270 |
| 13-7 | 100 | 2.4 | 0.3 | 0.2 | 0.1 | 0.7 | 1240 |
| 13-8 | 100 | 3.5 | 0.6 | 0.2 | 0.1 | 0.5 | 1280 |
| 13-*9 | 100 | 2.8 | 0.3 | 0.0 | 0.1 | 0.9 | 1340 |
| 13-10 | 100 | 2.8 | 0.3 | 0.005 | 0.1 | 0.9 | 1300 |
| 13-11 | 100 | 2.8 | 0.3 | 0.2 | 0.1 | 0.9 | 1260 |
| 13-12 | 100 | 2.8 | 0.3 | 0.5 | 0.1 | 0.9 | 1240 |
| 13-*13 | 100 | 2.8 | 0.3 | 0.6 | 0.1 | 0.9 | 1240 |
| 13-*14 | 100 | 2.8 | 0.3 | 0.2 | 0.005 | 0.9 | 1290 |
| 13-15 | 100 | 2.8 | 0.3 | 0.2 | 0.01 | 0.9 | 1270 |
| 13-16 | 100 | 2.8 | 0.3 | 0.2 | 0.05 | 0.9 | 1270 |
| 13-17 | 100 | 2.8 | 0.3 | 0.2 | 0.3 | 0.9 | 1250 |
| 13-*18 | 100 | 2.8 | 0.3 | 0.2 | 0.4 | 0.9 | 1250 |
| 13-*19 | 100 | 1.4 | 0.3 | 0.2 | 0.1 | 0.4 | 1270 |
| 13-20 | 100 | 3.3 | 0.4 | 0.2 | 0.1 | 0.8 | 1240 |
| 13-21 | 100 | 3.4 | 0.6 | 0.2 | 0.1 | 0.5 | 1250 |
| 13-22 | 100 | 2.9 | 0.3 | 0.1 | 0.1 | 0.9 | 1270 |
| 13-23 | 100 | 2.9 | 0.3 | 0.3 | 0.1 | 0.9 | 1250 |
| 13-24 | 100 | 2.9 | 0.3 | 0.4 | 0.1 | 0.9 | 1250 |
| 13-25 | 100 | 2.9 | 0.3 | 0.2 | 0.2 | 0.9 | 1270 |
| 13-26 | 100 | 2.2 | 0.1 | 0.2 | 0.1 | 2.0 | 1250 |

Samples marked with * lie outside the scope of the invention.

An Ag paste (Ag/Pd=30/70) was printed to form an internal electrode. The laminate was cut into 3.2 mm×1.6 mm and was fired in the air at 1240° to 1340° C. for two hours. Then, the electrodes of the silver paste were printed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of not smaller than 500 were measured and calculated by the line intercepting method. Furthermore, the dielectric loss was measured by applying a voltage of 2000 Vrms/cm at a frequency of 1 KHz. The results were as shown in Table 26.

TABLE 26

| Sample No. | Capacitance nf | Dielectric const. εr | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 13-1 | 176.9 | 3600 | 2.2 | 6 × 10$^4$ | −13–+6 | 0.4 | 2.7 |
| 13-2 | 139.9 | 2930 | 1.6 | 8 × 10$^4$ | −7–+6 | 0.4 | 2.4 |
| 13-3 | 127.6 | 2640 | 1.8 | 9 × 10$^4$ | −12–+7 | 0.3 | 2.6 |
| 13-*4 | 109.1 | 2260 | 2.0 | 5 × 10$^4$ | −18–+11 | 0.4 | 3.0 |
| 13-*5 | 107.1 | 2330 | 2.3 | 5 × 10$^3$ | −17–+9 | 1.8 | 4.0 |
| 13-6 | 127.9 | 2630 | 2.0 | 5 × 10$^4$ | −12–+7 | 0.5 | 2.6 |
| 13-7 | 137.0 | 2840 | 1.7 | 8 × 10$^4$ | −6–+6 | 0.4 | 2.5 |
| 13-8 | 146.1 | 3020 | 1.6 | 5 × 10$^4$ | −5–+6 | 0.3 | 2.6 |
| 13-*9 | 117.0 | 2370 | 2.3 | 3 × 10$^4$ | −5–+6 | 0.4 | 3.1 |
| 13-10 | 134.0 | 2740 | 1.9 | 5 × 10$^4$ | −7–+6 | 0.3 | 2.8 |
| 13-11 | 137.7 | 2840 | 1.6 | 7 × 10$^4$ | −6–+7 | 0.4 | 2.5 |
| 13-12 | 169.6 | 3520 | 1.7 | 7 × 10$^4$ | −10–+8 | 0.7 | 2.6 |
| 13-*13 | 185.1 | 3820 | 1.7 | 7 × 10$^4$ | −20–+5 | 0.6 | 2.7 |
| 13-*14 | 139.4 | 2930 | 2.6 | 8 × 10$^3$ | −7–+6 | 0.5 | 3.2 |
| 13-15 | 138.5 | 2880 | 2.2 | 5 × 10$^4$ | −5–+8 | 0.4 | 2.9 |

TABLE 26-continued

| Sample No. | Capacitance nf | Dielectric const. εr | Dielectric tan δ (%) | Insulating resistance IR (MΩ) | Temp. characteristics (%) | Particle diameter (μm) | Tan δ at 2000 V/cm (%) |
|---|---|---|---|---|---|---|---|
| 13-16 | 136.2 | 2820 | 1.8 | $8 \times 10^4$ | −6−+8 | 0.4 | 2.6 |
| 13-17 | 130.2 | 2560 | 1.5 | $1 \times 10^5$ | −5−+7 | 0.5 | 2.3 |
| 13-*18 | 108.3 | 2230 | 1.5 | $8 \times 10^4$ | −4−+8 | 0.6 | 2.3 |
| 13-*19 | 115.8 | 2350 | 2.6 | $5 \times 10^3$ | −25−+8 | 0.5 | 3.7 |
| 13-20 | 137.5 | 2850 | 1.7 | $6 \times 10^4$ | −7−+8 | 0.5 | 2.6 |
| 13-21 | 136.4 | 2810 | 1.6 | $5 \times 10^4$ | −6−+5 | 0.4 | 2.5 |
| 13-22 | 137.0 | 2840 | 1.8 | $5 \times 10^4$ | −4−+8 | 0.3 | 2.7 |
| 13-23 | 151.7 | 3130 | 1.7 | $5 \times 10^4$ | −9−+8 | 0.4 | 2.7 |
| 13-24 | 158.9 | 3310 | 1.8 | $5 \times 10^5$ | −7−+10 | 0.4 | 2.8 |
| 13-25 | 136.9 | 2840 | 1.5 | $7 \times 10^4$ | −5−+9 | 0.4 | 2.3 |
| 13-26 | 125.1 | 2510 | 1.8 | $7 \times 10^4$ | −12−+4 | 0.5 | 2.7 |

Samples marked with * lie outside the scope of the invention.

The dielectric ceramic compositions lying within the scope of the present invention all have dielectric constants which are as large as 2500 or more and satisfy X7R characteristics (change in the δ capacitance is within ±15% over a temperature range of from −55° C. to +125° C.) stipulated under the EIA Standards. Moreover, the dielectric losses tan δ are as small as 2.5% or less and exhibit losses of not larger than 3.0% even under the application of an AC voltage of 2000 Vrms/cm. The compositions further have insulation resistances (IR) of not smaller than $10^4$ MΩ.

In Table 25, samples Nos. 13-1 to 13-4 are those in which $Ta_2O_5$ was added in an amount of from 1.3 to 3.6 parts by weight to $BaTiO_3$ that is the chief component of the dielectric ceramic compositions. In these cases, MgO, $La_2O_3$ and $MnCO_3$ were added in amounts of 0.2 parts by weight, 0.2 parts by weight and 0.1 part by weight, respectively.

In the samples Nos. 13-1 to 13-3 ($Ta_2O_5$ is added in amounts of from 1.3 to 3.5 parts by weight), the dielectric constants εr are from 2640 to 3600, dielectric losses tan δ are not larger than 2.5%, the temperature characteristics are within ±13%, tan δ are not larger than 3.0% when an AC voltage of 2000 V/cm is applied, and insulation resistances (IR) are from 6 to $9 \times 10^4$ MΩ, which are within favorable ranges. That is, the dielectric ceramic compositions have large dielectric constants εr, excellent temperature characteristics, small dielectric losses tan δ and small AC voltage dependence of dielectric loss. In the sample No. 13-4 ($Ta_2O_5$ is added in an amount of 3.6 parts by weight), the dielectric constant εr is as small as 2260 and the temperature characteristics are deteriorated down to −18%.

In the samples Nos. 13-5 to 13-8, the amount of MgO to be added to $BaTiO_3$ which is the chief component of the dielectric ceramic compositions was changed to be from 0.05 to 0.6 parts by weight. In these cases, the amounts of $Ta_2O_5$, $La_2O_3$ and $MnCO_3$ were selected to be 1.3 to 3.5 parts by weight, 0.2 parts by weight and 0.1 part by weight, respectively.

In the sample No. 13-5 (MgO is contained in an amount of 0.05 parts by weight), tan δ becomes 4.0% when an AC voltage of 2000 V/cm is applied. In the samples Nos. 13-6 to 13-8 (MgO is added in an amount of from 0.06 to 0.60 parts by weight), the dielectric constants εr are from 2630 to 3020, dielectric losses tan δ are not larger than 2.0%, temperature characteristics are within ±12%, tan δ are not larger than 2.6% when an AC voltage of 2000 V/cm is applied, and insulation resistances (IR) are from 5 to $8 \times 10^4$ MΩ, which are within favorable ranges. That is, the dielectric ceramic compositions exhibit high dielectric constants εr, excellent temperature characteristics, small dielectric losses tan δ and small AC voltage dependence of dielectric loss. In the present invention, the amount of MgO to be added to $BaTiO_3$ is selected to be from 0.06 to 0.70 parts by weight per 100 parts by weight of $BaTiO_3$.

In the samples Nos. 13-9 to 13-13, the amount of $La_2O_3$ to be added to $BaTiO_3$ that is the chief component of the dielectric ceramic compositions was changed to be from 0 to 0.6 parts by weight. In these cases, the amounts of $Ta_2O_5$, MgO and $MnCO_3$ were selected to be 2.8 parts by weight, 0.3 parts by weight and 0.1 part by weight, respectively.

In the sample No. 13-9 (no $La_2O_3$ is added), the dielectric loss tan δ is 2.3% but the dielectric constant εr is as low as 2370. In the samples Nos. 13-10 to 13-12 ($La_2O_3$ is added in an amount of from 0.005 to 0.5 parts by weight), the dielectric constants εr are from 2740 to 3520, dielectric losses tan δ are not larger than 1.9%, temperature characteristics are within ±10%, tan δ are not larger than 2.8% when an AC voltage of 2000 V/cm is applied and insulation resistances (IR) are from 5 to $7 \times 10^4$ MΩ, which are within favorable ranges. That is, there are obtained dielectric ceramic compositions having high dielectric constants εr, excellent temperature characteristics, small dielectric losses tan δ and small AC voltage dependence of dielectric loss. In the sample No. 13-13 ($La_2O_3$ is added in an amount of 0.6 parts by weight), the dielectric constant εr is as large as 3820 and the dielectric loss tan δ is as small as 1.7%, but the temperature characteristics are deteriorated down to −20%. According to the present invention, therefore, the amount of $La_2O_3$ to be added to $BaTiO_3$ is selected to be from 0.005 to 0.520 parts by weight per 100 parts by weight of $BaTiO_3$.

In the samples Nos. 13-14 to 13-18, the amount of $MnCO_3$ to be added to $BaTiO_3$ which is the chief component of the dielectric ceramic compositions was changed to be from 0.005 to 0.4 parts by weight. In these cases, the amounts of $Ta_2O_5$ MgO and $La_2O_3$ were selected to be 2.8 parts by weight, 0.3 parts by weight and 0.2 parts by weight. In the sample No. 13-14 ($MnCO_3$ is added in an amount of 0.005 parts by weight), the dielectric constant εr is 2930 but the dielectric loss tan δ becomes 2.6%. Moreover, the insulation resistance is $8 \times 10^3$ MΩ. In the samples Nos. 13-15 to 13-17 ($MnCO_3$ is added in an amount of from 0.01 to 0.3 parts by weight), the dielectric constants εr are from 2560 to 2880, dielectric losses tan δ are not larger than 2.2%, temperature characteristics are within ±8%, tan δ are not larger than 2.9% when an AC voltage of 2000 V/cm is applied and insulation resistances (IR) are from $5 \times 10^4$ to $1 \times 10^5$ MΩ, which are within favorable ranges. That is, there are obtained dielectric ceramic compositions having large dielectric constants εr, excellent temperature characteristics, small dielectric losses tan δ and small AC voltage dependence of dielectric loss. In the sample No. 13-18 ($MnCO_3$ is added in an amount of 0.4 parts by weight), the dielectric loss tan δ is as small as 1.5% but the dielectric constant εr is as low as 2230. In the present invention, therefore, the amount of $MnCO_3$ to be added to $BaTiO_3$ is selected to be from 0.01 to 0.3 parts by weight per 100 parts by weight of $BaTiO_3$.

In the samples Nos. 13-19 to 13-26, the molar ratio of MgO to $Ta_2O_5$ was changed to be from 0.4 to 2.0. When the molar ratio is as small as 0.4 or is larger than 2.2, the dielectric constant becomes small and the temperature characteristics lie outside the range of the invention, either. When the molar ratio is within a range of from 0.5 to 2.2, on the other hand, the dielectric constant becomes not smaller than 2500, and the temperature characteristics and other properties become satisfactory.

Example 14

To the composition of the sample No. 13-11 of Table 25 were added the powders of $SiO_2$, $Al_2O_3$ and ZnO in amounts as shown in Table 27. The mixture was then formed into a tape in the same manner as in Example 13. The tape was laminated one upon the other and internal electrodes were formed to fabricate a laminate. Properties were measured in the same manner as in Example 13. The results were as shown in Table 28.

The sample possessed a composition comprising 2.8 parts by weight of $Ta_2O_5$, 0.3 parts by weight of MgO, 0.2 parts by weight of $La_2O_3$, 0.1 part by weight of MnO reckoned as $MnCO_3$, and $SiO_2$, $Al_2O_3$ and ZnO in predetermined amounts per 100 parts by weight of $BaTiO_3$.

TABLE 27

| Sample No. | $BaTiO_3$ pts. by wt. | $SiO_2$ pts. by wt. | $Al_2O_3$ pts. by wt. | ZnO pts. by wt. | Firing temp. (°C.) |
|---|---|---|---|---|---|
| 14-1 | 100 | 0.05 | — | — | 1250 |
| 14-2 | 100 | 0.1 | — | — | 1240 |
| 14-3 | 100 | 0.5 | — | — | 1230 |
| 14-4 | 100 | — | 0.05 | — | 1250 |
| 14-5 | 100 | — | 0.2 | — | 1240 |
| 14-6 | 100 | — | 0.5 | — | 1240 |
| 14-7 | 100 | 0.03 | 0.02 | — | 1250 |
| 14-8 | 100 | 0.2 | 0.3 | — | 1230 |
| 14-9 | 100 | — | — | 0.001 | 1250 |
| 14-10 | 100 | — | — | 0.01 | 1250 |
| 14-11 | 100 | — | — | 0.50 | 1240 |
| 14-12 | 100 | 0.1 | 0.1 | 0.001 | 1250 |
| 14-13 | 100 | 0.1 | 0.1 | 0.01 | 1240 |
| 14-14 | 100 | 0.1 | 0.1 | 0.1 | 1230 |

TABLE 28

| Sample No. | Capacitance nF | Dielectric const. $\epsilon_r$ | Dielectric loss tan δ (%) | Insulating resistance IR (MΩ) | Temp. characteristics (%) | Particle diameter (µm) | Tan δ at 2000 V/cm (%) |
|---|---|---|---|---|---|---|---|
| 14-1 | 144.9 | 2970 | 1.6 | 7 × 10⁴ | −5−+8 | 0.4 | 2.6 |
| 14-2 | 145.5 | 3010 | 1.6 | 7 × 10⁴ | −6−+6 | 0.4 | 2.5 |
| 14-3 | 154.0 | 3150 | 1.7 | 8 × 10⁴ | −8−+10 | 0.5 | 2.6 |
| 14-4 | 139.9 | 2870 | 1.6 | 7 × 10⁴ | −3−+9 | 0.4 | 2.6 |
| 14-5 | 144.3 | 2960 | 1.6 | 7 × 10⁴ | −5−+7 | 0.3 | 2.5 |
| 14-6 | 148.8 | 3070 | 1.7 | 8 × 10⁴ | −5−+8 | 0.4 | 2.5 |
| 14-7 | 142.9 | 2890 | 1.6 | 7 × 10⁴ | −5−+9 | 0.4 | 2.5 |
| 14-8 | 145.2 | 2980 | 1.7 | 8 × 10⁴ | −4−+8 | 0.4 | 2.5 |
| 14-9 | 145.4 | 2990 | 1.6 | 8 × 10⁴ | −9−+7 | 0.4 | 2.6 |
| 14-10 | 147.5 | 3060 | 1.7 | 8 × 10⁴ | −8−+10 | 0.5 | 2.6 |
| 14-11 | 157.0 | 3240 | 1.8 | 1 × 10⁵ | −13−+10 | 0.4 | 2.9 |
| 14-12 | 148.0 | 3070 | 1.6 | 8 × 10⁴ | −8−+8 | 0.4 | 2.5 |
| 14-13 | 153.6 | 3160 | 1.7 | 8 × 10⁴ | −9−+6 | 0.4 | 2.7 |
| 14-14 | 173.0 | 3520 | 1.9 | 1 × 10⁵ | −13−+10 | 0.5 | 2.8 |

It will be understood from these Tables 27 and 28 that with $SiO_2$, $Al_2O_3$ and ZnO being contained, the compositions are fired at temperatures lower than those of when these compounds are not contained (sample No. 13-11) and exhibit increased dielectric constants.

Example 15

A $BaTiO_3$ powder having an average particle diameter of not larger than 1.0 µm formed by the oxalic acid method was used as a chief component. Powders of $Ta_2O_5$, MgO, $Nd_2O_3$ and $MnCO_3$ were weighed as shown in Table 29 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 µm by the doctor blade method. The tape was cut into 130 mm×100 mm and was overlapped in a number of 20 pieces one upon the other to prepare a laminate thereof.

TABLE 29

| Sample No. | $BaTiO_3$ pts.by wt. | $Ta_2O_5$ pts.by wt. | MgO pts. by wt. | $Nd_2O_3$ pts.by wt. | $MnCO_3$ pts.by wt. | $Ta_2O_5$/MgO molar ratio | Firing temp. (°C.) |
|---|---|---|---|---|---|---|---|
| 15-1 | 100 | 1.3 | 0.2 | 0.2 | 0.1 | 0.6 | 1280 |
| 15-2 | 100 | 2.4 | 0.2 | 0.2 | 0.1 | 1.1 | 1260 |
| 15-3 | 100 | 3.5 | 0.2 | 0.2 | 0.1 | 1.6 | 1260 |
| 15-*4 | 100 | 3.6 | 0.2 | 0.2 | 0.1 | 1.6 | 1260 |
| 15-*5 | 100 | 1.3 | 0.05 | 0.2 | 0.1 | 2.4 | 1280 |
| 15-6 | 100 | 1.3 | 0.06 | 0.2 | 0.1 | 2.0 | 1280 |
| 15-7 | 100 | 2.4 | 0.3 | 0.2 | 0.1 | 0.7 | 1260 |
| 15-8 | 100 | 3.5 | 0.6 | 0.2 | 0.1 | 0.5 | 1280 |
| 15-*9 | 100 | 2.8 | 0.3 | 0.0 | 0.1 | 0.9 | 1340 |
| 15-10 | 100 | 2.8 | 0.3 | 0.005 | 0.1 | 0.9 | 1280 |
| 15-11 | 100 | 2.8 | 0.3 | 0.2 | 0.1 | 0.9 | 1270 |
| 15-12 | 100 | 2.8 | 0.3 | 0.5 | 0.1 | 0.9 | 1260 |
| 15-*13 | 100 | 2.8 | 0.3 | 0.6 | 0.1 | 0.9 | 1260 |
| 15-*14 | 100 | 2.8 | 0.3 | 0.2 | 0.005 | 0.9 | 1280 |
| 15-15 | 100 | 2.8 | 0.3 | 0.2 | 0.01 | 0.9 | 1280 |
| 15-16 | 100 | 2.8 | 0.3 | 0.2 | 0.05 | 0.9 | 1260 |
| 15-17 | 100 | 2.8 | 0.3 | 0.2 | 0.3 | 0.9 | 1260 |
| 15-*18 | 100 | 2.8 | 0.3 | 0.2 | 0.4 | 0.9 | 1260 |
| 15-*19 | 100 | 1.4 | 0.3 | 0.2 | 0.1 | 0.4 | 1280 |
| 15-20 | 100 | 3.3 | 0.4 | 0.2 | 0.1 | 0.8 | 1260 |
| 15-21 | 100 | 3.4 | 0.6 | 0.2 | 0.1 | 0.5 | 1280 |
| 15-22 | 100 | 2.9 | 0.3 | 0.1 | 0.1 | 0.9 | 1260 |
| 15-23 | 100 | 2.9 | 0.3 | 0.3 | 0.1 | 0.9 | 1260 |
| 15-24 | 100 | 2.9 | 0.3 | 0.4 | 0.1 | 0.9 | 1260 |
| 15-25 | 100 | 2.9 | 0.3 | 0.2 | 0.2 | 0.9 | 1260 |
| 15-26 | 100 | 2.2 | 0.1 | 0.2 | 0.1 | 2.0 | 1260 |

Samples marked with * lie outside the scope of the invention.

An Ag paste (Ag/Pd=30/70) was printed to form an internal electrode. The laminate was cut into 3.2 mm×1.6 mm and was fired in the air at 1260° to 1340° C. for two hours. Then, the electrodes of the silver paste were printed on both end surfaces at 800° C. for 10 minutes to obtain a sample for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of more than 500 were measured and calculated by the line intercepting method. Furthermore, the dielectric loss was measured by applying a voltage of 2000 Vrms/cm at a frequency of 1 KHz. The results were as shown in Table 30.

TABLE 30

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 15-1 | 173.4 | 3530 | 2.1 | 6 × 10⁴ | −13−+8 | 0.5 | 2.6 |
| 15-2 | 137.1 | 2870 | 1.6 | 8 × 10⁴ | −9−+6 | 0.4 | 2.3 |
| 15-3 | 125.0 | 2590 | 1.6 | 9 × 10⁴ | −11−+7 | 0.4 | 2.4 |
| 15-*4 | 106.9 | 2220 | 2.0 | 5 × 10⁴ | −18−+8 | 0.4 | 3.0 |
| 15-*5 | 105.0 | 2280 | 2.5 | 5 × 10³ | −20−+9 | 1.6 | 4.0 |
| 15-6 | 125.3 | 2580 | 2.0 | 8 × 10⁴ | −12−+3 | 0.4 | 2.6 |
| 15-7 | 134.3 | 2780 | 1.6 | 8 × 10⁴ | −5−+9 | 0.3 | 2.5 |
| 15-8 | 143.2 | 2960 | 1.6 | 5 × 10⁴ | −8−+6 | 0.3 | 2.6 |
| 15-*9 | 114.7 | 2320 | 2.2 | 5 × 10⁴ | −6−+6 | 0.5 | 3.0 |
| 15-10 | 131.3 | 2690 | 1.8 | 5 × 10⁴ | −7−+8 | 0.4 | 2.8 |
| 15-11 | 134.9 | 2780 | 1.6 | 8 × 10⁴ | −5−+7 | 0.4 | 2.5 |
| 15-12 | 166.2 | 3450 | 1.7 | 8 × 10⁴ | −11−+4 | 0.3 | 2.7 |
| 15-*13 | 181.4 | 3740 | 1.9 | 7 × 10⁴ | −20−+3 | 0.5 | 2.9 |
| 15-*14 | 136.6 | 2870 | 2.6 | 5 × 10³ | −7−+16 | 0.4 | 3.5 |
| 15-15 | 135.7 | 2820 | 2.2 | 6 × 10⁴ | −8−+8 | 0.4 | 2.9 |
| 15-16 | 133.5 | 2760 | 1.9 | 8 × 10⁴ | −6−+8 | 0.5 | 2.7 |
| 15-17 | 130.2 | 2660 | 1.6 | 1 × 10⁵ | −5−+7 | 0.8 | 2.4 |
| 15-*18 | 108.5 | 2220 | 1.5 | 8 × 10⁴ | −5−+8 | 0.7 | 2.3 |
| 15-*19 | 116.8 | 2360 | 2.8 | 5 × 10³ | −25−+8 | 0.5 | 3.7 |
| 15-20 | 134.8 | 2790 | 1.8 | 8 × 10⁴ | −9−+8 | 0.4 | 2.8 |
| 15-21 | 133.7 | 2750 | 1.7 | 6 × 10⁴ | −7−+5 | 0.3 | 2.6 |
| 15-22 | 135.6 | 2810 | 1.8 | 6 × 10⁴ | −6−+8 | 0.4 | 2.7 |
| 15-23 | 148.7 | 3070 | 1.7 | 5 × 10⁵ | −9−+8 | 0.3 | 2.6 |
| 15-24 | 155.7 | 3240 | 1.8 | 6 × 10⁴ | −7−+10 | 0.4 | 2.8 |
| 15-25 | 134.2 | 2780 | 1.6 | 7 × 10⁴ | −6−+8 | 0.4 | 2.3 |
| 15-26 | 125.6 | 2570 | 1.6 | 8 × 10⁴ | −11−+5 | 0.4 | 2.6 |

Samples marked with * lie outside the scope of the invention.

Example 16

To the composition of the sample No. 15-11 of Table 29 were added the powders of $SiO_2$, $Al_2O_3$ and ZnO in amounts as shown in Table 31, and the mixture was formed into a tape in the same manner as in Example 15. The tape was laminated, an internal electrode was formed, and a laminate was prepared. Properties were measured in the same manner as in Example 15. The results were as shown in Table 32.

The sample possessed a composition comprising 2.8 parts by weight of $Ta_2O_5$, 0.3 parts by weight of MgO, 0.2 parts by weight of $Nd_2O_3$, 0.1 part by weight of MnO reckoned as $MnCO_3$, and $SiO_2$, $Al_2O_3$ and ZnO in predetermined amounts per 100 parts by weight of $BaTiO_3$.

TABLE 31

| Sample No. | BaTiO₃ pts.by wt. | SiO₂ pts.by wt. | Al₂O₃ pts.by wt. | ZnO pts.by wt. | Firing temp. (°C.) |
|---|---|---|---|---|---|
| 16-1 | 100 | 0.05 | — | — | 1240 |
| 16-2 | 100 | 0.1 | — | — | 1240 |
| 16-3 | 100 | 0.5 | — | — | 1230 |
| 16-4 | 100 | — | 0.05 | — | 1240 |
| 16-5 | 100 | — | 0.2 | — | 1240 |
| 16-6 | 100 | — | 0.5 | — | 1230 |
| 16-7 | 100 | 0.03 | 0.02 | — | 1240 |
| 16-8 | 100 | 0.2 | 0.3 | — | 1240 |
| 16-9 | 100 | — | — | 0.001 | 1260 |
| 16-10 | 100 | — | — | 0.01 | 1260 |
| 16-11 | 100 | — | — | 0.50 | 1240 |
| 16-12 | 100 | 0.1 | 0.1 | 0.001 | 1240 |
| 16-13 | 100 | 0.1 | 0.1 | 0.01 | 1240 |
| 16-14 | 100 | 0.1 | 0.1 | 0.1 | 1240 |

TABLE 32

| Sample No. | Capacitance nF | Dielectric const. εr | Dielectric loss tan δ (%) | Insulating resistance IR (MΩ) | Temp. characteristics (%) | Particle diameter (μm) | Tan δ at 2000 V/cm (%) |
|---|---|---|---|---|---|---|---|
| 16-1 | 142.0 | 2910 | 1.6 | 7 × 10⁴ | −5−+8 | 0.4 | 2.6 |
| 16-2 | 142.6 | 2950 | 1.7 | 8 × 10⁴ | −5−+9 | 0.5 | 2.6 |
| 16-3 | 150.9 | 3090 | 1.8 | 8 × 10⁴ | −8−+6 | 0.4 | 2.7 |
| 16-4 | 137.1 | 2810 | 1.6 | 6 × 10⁴ | −5−+9 | 0.4 | 2.6 |
| 16-5 | 141.4 | 2900 | 1.6 | 8 × 10⁴ | −6−+7 | 0.3 | 2.5 |
| 16-6 | 145.8 | 3010 | 1.7 | 9 × 10⁴ | −7−+8 | 0.4 | 2.6 |
| 16-7 | 140.0 | 2830 | 1.6 | 8 × 10⁴ | −6−+9 | 0.5 | 2.6 |
| 16-8 | 142.2 | 2920 | 1.7 | 8 × 10⁴ | −4−+8 | 0.4 | 2.6 |
| 16-9 | 142.5 | 2930 | 1.6 | 7 × 10⁴ | −8−+7 | 0.4 | 2.6 |
| 16-10 | 144.5 | 3000 | 1.7 | 8 × 10⁴ | −7−+10 | 0.4 | 2.6 |
| 16-11 | 153.9 | 3180 | 1.7 | 8 × 10⁴ | −12−+6 | 0.5 | 2.8 |
| 16-12 | 145.0 | 3010 | 1.7 | 6 × 10⁴ | −7−+8 | 0.4 | 2.6 |
| 16-13 | 150.5 | 3100 | 1.6 | 6 × 10⁴ | −8−+6 | 0.4 | 2.6 |
| 16-14 | 169.0 | 3440 | 1.9 | 8 × 10⁴ | −11−+8 | 0.5 | 2.9 |

It will be understood from these Tables 31 and 32 that with $SiO_2$, $Al_2O_3$ and ZnO being contained, the compositions are fired at temperatures lower than those of when these compounds are not contained (sample No. 15-11) and exhibit increased dielectric constants.

Example 17

A $BaTiO_3$ powder having an average particle diameter of not larger than 1.0 μm formed by the oxalic acid method was used as a chief component. Powders of at least one of the oxides of rare earth elements (RE oxides) such as $Ta_2O_5$, MgO, $Pr_6O_{11}$, $Sm_2O_3$, $Gd_2O_3$ and $Tb_4O_7$, as well as $MnCO_3$ were weighed as shown in Tables 33 and 34 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other to prepare a laminate thereof.

TABLE 33

| Sample No. | BaTiO₃ pts.by wt. | Ta₂O₅ pts.by wt. | MgO pts.by wt. | RE oxide pts.by wt. | MnCO₃ pts.by wt. | Ta₂O₅/MgO molar ratio | Firing temp. (°C.) |
|---|---|---|---|---|---|---|---|
| 17-1 | 100 | 1.3 | 0.2 | 0.2 (Pr) | 0.1 | 0.6 | 1280 |
| 17-2 | 100 | 2.4 | 0.2 | 0.2 (Pr) | 0.1 | 1.1 | 1270 |
| 17-3 | 100 | 3.5 | 0.2 | 0.2 (Pr) | 0.1 | 1.6 | 1250 |
| 17-*4 | 100 | 3.6 | 0.2 | 0.2 (Pr) | 0.1 | 1.6 | 1250 |
| 17-*5 | 100 | 1.3 | 0.05 | 0.2 (Pr) | 0.1 | 2.4 | 1280 |

TABLE 33-continued

| Sample No. | BaTiO₃ pts.by wt. | Ta₂O₅ pts.by wt. | MgO pts.by wt. | RE oxide pts.by wt. | MnCO₃ pts.by wt. | Ta₂O₅/MgO molar ratio | Firing temp. (°C.) |
|---|---|---|---|---|---|---|---|
| 17-6 | 100 | 1.3 | 0.06 | 0.2 (Pr) | 0.1 | 2.0 | 1270 |
| 17-7 | 100 | 2.4 | 0.3 | 0.2 (Pr) | 0.1 | 0.7 | 1240 |
| 17-8 | 100 | 3.5 | 0.6 | 0.2 (Pr) | 0.1 | 0.5 | 1280 |
| 17-*9 | 100 | 2.8 | 0.3 | — | 0.1 | 0.9 | 1340 |
| 17-10 | 100 | 2.8 | 0.3 | 0.005 (Pr) | 0.1 | 0.9 | 1300 |
| 17-11 | 100 | 2.8 | 0.3 | 0.2 (Pr) | 0.1 | 0.9 | 1260 |
| 17-12 | 100 | 2.8 | 0.3 | 0.5 (Pr) | 0.1 | 0.9 | 1240 |
| 17-*13 | 100 | 2.8 | 0.3 | 0.6 (Pr) | 0.1 | 0.9 | 1240 |
| 17-14 | 100 | 2.8 | 0.3 | 0.005 (Sm) | 0.1 | 0.9 | 1300 |
| 17-15 | 100 | 2.8 | 0.3 | 0.1 (Sm) | 0.1 | 0.9 | 1280 |
| 17-16 | 100 | 2.8 | 0.3 | 0.2 (Sm) | 0.1 | 0.9 | 1260 |
| 17-17 | 100 | 2.8 | 0.3 | 0.5 (Sm) | 0.1 | 0.9 | 1240 |
| 17-*18 | 100 | 2.8 | 0.3 | 0.6 (Sm) | 0.1 | 0.9 | 1240 |
| 17-19 | 100 | 2.8 | 0.3 | 0.005 (Gd) | 0.1 | 0.9 | 1300 |
| 17-20 | 100 | 2.8 | 0.3 | 0.1 (Gd) | 0.1 | 0.9 | 1280 |
| 17-21 | 100 | 2.8 | 0.3 | 0.2 (Gd) | 0.1 | 0.9 | 1260 |
| 17-22 | 100 | 2.8 | 0.3 | 0.5 (Gd) | 0.1 | 0.9 | 1240 |
| 17-*23 | 100 | 2.8 | 0.3 | 0.6 (Gd) | 0.1 | 0.9 | 1240 |

Samples marked with * lie outside the scope of the invention.

TABLE 34

| Sample No. | BaTiO₃ pts.by wt. | Ta₂O₅ pts.by wt. | MgO pts.by wt. | RE oxide pts.by wt. | MnCO₃ pts.by wt. | Ta₂O₅/MgO molar ratio | Firing temp. (°C.) |
|---|---|---|---|---|---|---|---|
| 17-24 | 100 | 2.8 | 0.3 | 0.005 (Tb) | 0.1 | 0.9 | 1300 |
| 17-25 | 100 | 2.8 | 0.3 | 0.2 (Tb) | 0.1 | 0.9 | 1260 |
| 17-26 | 100 | 2.8 | 0.3 | 0.5 (Tb) | 0.1 | 0.9 | 1240 |
| 17-*27 | 100 | 2.8 | 0.3 | 0.6 (Tb) | 0.1 | 0.9 | 1240 |
| 17-*28 | 100 | 2.8 | 0.3 | 0.2 (Pr) | 0.005 | 0.9 | 1290 |
| 17-29 | 100 | 2.8 | 0.3 | 0.2 (Pr) | 0.01 | 0.9 | 1270 |
| 17-30 | 100 | 2.8 | 0.3 | 0.2 (Pr) | 0.05 | 0.9 | 1270 |
| 17-31 | 100 | 2.8 | 0.3 | 0.2 (Pr) | 0.3 | 0.9 | 1250 |
| 17-*32 | 100 | 2.8 | 0.3 | 0.2 (Pr) | 0.4 | 0.9 | 1250 |
| 17-*33 | 100 | 1.4 | 0.3 | 0.2 (Pr) | 0.1 | 0.4 | 1270 |
| 17-34 | 100 | 3.3 | 0.4 | 0.2 (Pr) | 0.1 | 0.8 | 1240 |
| 17-35 | 100 | 3.4 | 0.6 | 0.2 (Pr) | 0.1 | 0.5 | 1250 |
| 17-36 | 100 | 2.9 | 0.3 | 0.1 (Pr) | 0.1 | 0.9 | 1270 |
| 17-37 | 100 | 2.9 | 0.3 | 0.3 (Pr) | 0.1 | 0.9 | 1250 |
| 17-38 | 100 | 2.9 | 0.3 | 0.4 (Pr) | 0.1 | 0.9 | 1250 |
| 17-39 | 100 | 2.9 | 0.3 | 0.2 (Pr) | 0.2 | 0.9 | 1270 |
| 17-40 | 100 | 2.2 | 0.1 | 0.2 (Pr) | 0.1 | 2.0 | 1250 |

Samples marked with * lie outside the scope of the invention.

An Ag paste (Ag/Pd=30/70) was printed to form an internal electrode. The laminate was cut into 3.2 mm×1.6 mm and was fired in the air at 1240° to 1340° C. for two hours. Then, the electrodes of the silver paste were printed on both end surfaces at 800° C. for 10 minutes to obtain a sample for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of more than 500 were measured and calculated by the line intercepting method.

Furthermore, the dielectric loss was measured by applying a voltage of 2000 Vrms/cm at a frequency of 1 KHz. The results were as shown in Tables 35 and 36.

TABLE 35

| Sample No. | Capacitance nF | Dielectric const. εr | Dielectric loss tan δ (%) | Insulating resistance IR (MΩ) | Temp. characteristics (%) | Ave. particle size (μm) | Tan δ at 2000 V/cm (%) |
|---|---|---|---|---|---|---|---|
| 17-1 | 178.2 | 3630 | 2.3 | 6 × 10⁴ | −12~+8 | 0.3 | 2.8 |
| 17-2 | 141.3 | 2960 | 1.7 | 8 × 10⁴ | −8~+7 | 0.4 | 2.5 |
| 17-3 | 128.9 | 2670 | 1.8 | 8 × 10⁴ | −12~+8 | 0.4 | 2.7 |
| 17-*4 | 109.2 | 2260 | 2.0 | 5 × 10⁴ | −18~+3 | 0.5 | 3.0 |
| 17-*5 | 111.5 | 2330 | 2.5 | 5 × 10³ | −19~+9 | 1.4 | 4.3 |
| 17-6 | 129.1 | 2660 | 2.0 | 5 × 10⁴ | −11~+7 | 0.5 | 2.7 |
| 17-7 | 138.4 | 2880 | 1.7 | 8 × 10⁴ | −7~+6 | 0.4 | 2.6 |
| 17-8 | 147.6 | 3050 | 1.6 | 5 × 10⁴ | −6~+6 | 0.3 | 2.5 |
| 17-*9 | 118.1 | 2390 | 2.4 | 3 × 10⁴ | −6~+6 | 0.5 | 3.2 |

TABLE 35-continued

| Sample No. | Capacitance nF | Dielectric const. εr | Dielectric loss tan δ (%) | Insulating resistance IR (MΩ) | Temp. characteristics (%) | Ave. particle size (μm) | Tan δ at 2000 V/cm (%) |
|---|---|---|---|---|---|---|---|
| 17-10 | 135.3 | 2770 | 2.0 | 5 × 10⁴ | −5–+6 | 0.4 | 2.8 |
| 17-11 | 139.1 | 2880 | 1.6 | 7 × 10⁴ | −6–+7 | 0.4 | 2.5 |
| 17-12 | 171.3 | 3550 | 1.7 | 8 × 10⁴ | −11–+7 | 0.4 | 2.6 |
| 17-*13 | 185.5 | 3840 | 1.8 | 7 × 10⁴ | −22–+5 | 0.4 | 2.7 |
| 17-14 | 132.6 | 2710 | 1.9 | 5 × 10⁴ | −7–+8 | 0.5 | 2.7 |
| 17-15 | 136.3 | 2820 | 1.6 | 5 × 10⁴ | −9–+8 | 0.4 | 2.6 |
| 17-16 | 140.4 | 2900 | 1.6 | 6 × 10⁴ | −9–+8 | 0.4 | 2.6 |
| 17-17 | 167.9 | 3480 | 1.7 | 8 × 10⁴ | −10–+5 | 0.4 | 2.6 |
| 17-*18 | 181.8 | 3760 | 1.8 | 8 × 10⁴ | −20–+8 | 0.5 | 2.7 |
| 17-19 | 131.2 | 2720 | 1.9 | 5 × 10⁴ | −6–+8 | 0.4 | 2.7 |
| 17-20 | 134.9 | 2790 | 1.6 | 7 × 10⁴ | −8–+10 | 0.4 | 2.7 |
| 17-21 | 139.0 | 2840 | 1.7 | 6 × 10⁴ | −7–+8 | 0.4 | 2.6 |
| 17-22 | 166.2 | 3440 | 1.6 | 5 × 10⁴ | −9–+5 | 0.4 | 2.6 |
| 17-*23 | 180.0 | 3720 | 1.8 | 5 × 10⁴ | −18–+6 | 0.4 | 2.7 |

Samples marked with * lie outside the scope of the invention.

TABLE 36

| Sample No. | Capacitance nF | Dielectric const. εr | Dielectric loss tan δ (%) | Insulating resistance IR (MΩ) | Temp. characteristics (%) | Ave. particle size (μm) | Tan δ at 2000 V/cm (%) |
|---|---|---|---|---|---|---|---|
| 17-24 | 129.9 | 2690 | 1.9 | 5 × 10⁴ | −9–+8 | 0.4 | 2.6 |
| 17-25 | 137.6 | 2810 | 1.6 | 5 × 10⁴ | −7–+10 | 0.4 | 2.5 |
| 17-26 | 164.5 | 3410 | 1.6 | 7 × 10⁴ | −9–+9 | 0.4 | 2.5 |
| 17-*27 | 178.2 | 3680 | 1.8 | 7 × 10⁴ | −20–+4 | 0.4 | 2.7 |
| 17-*28 | 138.8 | 2880 | 2.6 | 5 × 10³ | −6–+8 | 0.5 | 3.3 |
| 17-29 | 139.4 | 2890 | 2.2 | 5 × 10⁴ | −5–+6 | 0.4 | 2.9 |
| 17-30 | 135.3 | 2790 | 1.7 | 8 × 10⁴ | −7–+5 | 0.4 | 2.6 |
| 17-31 | 130.4 | 2680 | 1.4 | 1 × 10⁵ | −5–+6 | 0.7 | 2.2 |
| 17-*32 | 107.9 | 2220 | 1.4 | 8 × 10⁴ | −4–+6 | 0.7 | 2.2 |
| 17-*33 | 112.6 | 2340 | 2.7 | 5 × 10³ | −25–+5 | 0.5 | 3.8 |
| 17-34 | 135.7 | 2790 | 1.8 | 6 × 10⁴ | −8–+5 | 0.4 | 2.5 |
| 17-35 | 135.3 | 2780 | 1.6 | 5 × 10⁴ | −6–+6 | 0.3 | 2.6 |
| 17-36 | 136.0 | 2800 | 1.7 | 6 × 10⁴ | −4–+9 | 0.3 | 2.7 |
| 17-37 | 149.8 | 3080 | 1.7 | 5 × 10⁴ | −7–+6 | 0.4 | 2.6 |
| 17-38 | 158.2 | 3280 | 1.8 | 7 × 10⁴ | −8–+10 | 0.4 | 2.8 |
| 17-39 | 135.6 | 2800 | 1.6 | 7 × 10⁴ | −6–+8 | 0.5 | 2.5 |
| 17-40 | 126.1 | 2600 | 1.9 | 5 × 10⁴ | −12–+6 | 0.4 | 2.9 |

Samples marked with * lie outside the scope of the invention.

The dielectric ceramic compositions lying within the scope of the present invention all have dielectric constants which are as large as 2500 or more and satisfy X7R characteristics (change in the capacitance is within ±15% over a temperature range of from −55° C. to +125° C.) stipulated under the EIA Standards. Moreover, the dielectric losses tan δ are as small as 2.5% or less and exhibit losses of not larger than 3.0% even under the application of an AC voltage of 2000 Vrms/cm. The compositions further have insulation resistances (IR) of not smaller than 10⁴ MΩ.

Example 18

To the composition of the sample No. 17-11 of Table 33 were added the powders of $SiO_2$, $Al_2O_3$ and ZnO in amounts as shown in Table 37, and the mixture was formed into a tape in the same manner as in Example 13. The tape was laminated, an internal electrode was formed, and a laminate was prepared. Properties were measured in the same manner as in Example 13. The results were as shown in Table 38.

The sample possessed a composition comprising 2.8 parts by weight of $Ta_2O_5$, 0.3 parts by weight of MgO, 0.2 parts by weight of $Pr_6O_{11}$, 0.1 part by weight of MnO reckoned as $MnCO_3$, and $SiO_2$, $Al_2O_3$ and ZnO in predetermined amounts per 100 parts by weight of $BaTiO_3$.

TABLE 37

| Sample No. | BaTiO₃ pts.by wt. | SiO₂ pts.by wt. | Al₂O₃ pts.by wt. | ZnO pts.by wt. | Firing temp (°C.) |
|---|---|---|---|---|---|
| 18-1 | 100 | 0.05 | — | — | 1250 |
| 18-2 | 100 | 0.1 | — | — | 1240 |
| 18-3 | 100 | 0.5 | — | — | 1230 |
| 18-4 | 100 | — | 0.05 | — | 1250 |
| 18-5 | 100 | — | 0.2 | — | 1240 |
| 18-6 | 100 | — | 0.5 | — | 1240 |
| 18-7 | 100 | 0.03 | 0.02 | — | 1250 |
| 18-8 | 100 | 0.2 | 0.3 | — | 1230 |
| 18-9 | 100 | — | — | 0.001 | 1260 |
| 18-10 | 100 | — | — | 0.01 | 1250 |
| 18-11 | 100 | — | — | 0.50 | 1240 |
| 18-12 | 100 | 0.1 | 0.1 | 0.001 | 1250 |
| 18-13 | 100 | 0.1 | 0.1 | 0.01 | 1240 |
| 18-14 | 100 | 0.1 | 0.1 | 0.1 | 1230 |

TABLE 38

| Sample No. | Capacitance nF | Dielectric const. εr | Dielectric loss tan δ (%) | Insulating resistance IR (MΩ) | Temp. characteristics (%) | Ave. particle size (μm) | Tan δ at 2000 V/cm (%) |
|---|---|---|---|---|---|---|---|
| 18-1 | 146.3 | 3000 | 1.6 | 8 × 10⁴ | −6–+8 | 0.4 | 2.6 |
| 18-2 | 146.9 | 3040 | 1.6 | 7 × 10⁴ | −8–+6 | 0.4 | 2.6 |
| 18-3 | 135.6 | 2810 | 1.7 | 8 × 10⁴ | −8–+10 | 0.5 | 2.6 |
| 18-4 | 141.9 | 2900 | 1.6 | 7 × 10⁴ | −5–+9 | 0.4 | 2.6 |
| 18-5 | 145.7 | 2990 | 1.6 | 8 × 10⁴ | −5–+6 | 0.4 | 2.5 |
| 18-6 | 132.8 | 2750 | 1.7 | 8 × 10⁴ | −4–+8 | 0.4 | 2.6 |
| 18-7 | 144.3 | 2920 | 1.6 | 7 × 10⁴ | −7–+9 | 0.4 | 2.5 |
| 18-8 | 146.7 | 3010 | 1.7 | 8 × 10⁴ | −5–+8 | 0.4 | 2.6 |
| 18-9 | 146.8 | 3020 | 1.6 | 8 × 10⁴ | −8–+7 | 0.4 | 2.6 |
| 18-10 | 149.0 | 3090 | 1.7 | 6 × 10⁴ | −6–+10 | 0.5 | 2.6 |
| 18-11 | 158.5 | 3270 | 1.8 | 5 × 10⁴ | −10–+10 | 0.6 | 2.8 |
| 18-12 | 149.4 | 3100 | 1.6 | 8 × 10⁴ | −6–+8 | 0.5 | 2.5 |
| 18-13 | 155.1 | 3190 | 1.7 | 8 × 10⁴ | −9–+6 | 0.5 | 2.7 |
| 18-14 | 174.5 | 3550 | 1.8 | 6 × 10⁴ | −10–+6 | 0.7 | 2.8 |

It will be understood from these Tables 37 and 38 that with $SiO_2$, $Al_2O_3$ and ZnO being contained, the compositions are fired at temperatures lower than those of when these compounds are not contained (sample No. 17-11) and exhibit increased dielectric constants.

Example 19

A $BaTiO_3$ powder having an average particle diameter of not larger than 1.0 μm formed by the hydrothermal synthesizing method was used as a chief component. Powders of $Nb_2O_5$, MgO, $La_2O_3$, $MnCO_3$ and ZnO were weighed as shown in Table 39 with respect to 100 parts by weight of $BaTiO_3$, and were wet-pulverized in a ball mill for 20 to 48 hours. Then, an organic sticking agent was added thereto followed by stirring, and the mixture was formed into a tape having a thickness of 15 μm by the doctor blade method. The tape was cut into 130 mm×100 mm and was overlapped in a number of 20 pieces one upon the other and was hot-pressed at 80° C. to prepare a laminate thereof.

TABLE 39

| Sample No. | BaTiO$_3$ pts. by wt. | Nb$_2$O$_5$ pts. by wt. | MgO pts. by wt. | ZnO pts. by wt. | La$_2$O$_3$ pts. by wt. | MnCO$_2$ pts. by wt. | (Nb$_2$O$_5$)/(MgO) molar ratio | (Nb$_2$O$_5$)/ (MgO + ZnO) molar ratio | Firing temp. (°C.) |
|---|---|---|---|---|---|---|---|---|---|
| 19-1 | 100 | 0.8 | 0.1 | 0.1 | 0.2 | 0.1 | 1.21 | 0.8 | 1300 |
| 19-2 | 100 | 2.3 | 0.3 | 0.2 | 0.2 | 0.1 | 1.16 | 0.9 | 1250 |
| 19-3 | 100 | 2.5 | 0.7 | 0.1 | 0.2 | 0.1 | 0.54 | 0.5 | 1300 |
| 19-4 | 100 | 1.8 | 0.2 | 0.2 | 0.005 | 0.1 | 1.36 | 0.9 | 1290 |
| 19-5 | 100 | 1.8 | 0.2 | 0.2 | 0.2 | 0.1 | 1.36 | 0.9 | 1250 |
| 19-6 | 100 | 1.8 | 0.2 | 0.2 | 0.52 | 0.1 | 1.36 | 0.9 | 1240 |
| 19-7 | 100 | 1.8 | 0.2 | 0.2 | 0.2 | 0.01 | 1.36 | 0.9 | 1280 |
| 19-8 | 100 | 1.8 | 0.2 | 0.2 | 0.2 | 0.05 | 1.36 | 0.9 | 1260 |
| 19-9 | 100 | 1.8 | 0.2 | 0.2 | 0.2 | 0.3 | 1.36 | 0.9 | 1250 |
| 19-10 | 100 | 1.8 | 0.15 | 0.2 | 0.2 | 0.1 | 1.82 | 1.1 | 1250 |
| 19-11 | 100 | 1.8 | 0.15 | 0.3 | 0.2 | 0.1 | 0.81 | 0.9 | 1250 |
| 19-12 | 100 | 1.8 | 0.15 | 0.4 | 0.2 | 0.1 | 1.82 | 0.8 | 1240 |
| 19-13 | 100 | 1.8 | 0.15 | 0.5 | 0.2 | 0.1 | 1.82 | 0.7 | 1230 |
| 19-14 | 100 | 2.0 | 0.4 | 0.1 | 0.2 | 0.1 | 0.76 | 0.7 | 1250 |
| 19-15 | 100 | 2.2 | 0.6 | 0.1 | 0.2 | 0.1 | 0.56 | 0.5 | 1280 |
| 19-16 | 100 | 1.8 | 0.3 | 0.15 | 0.1 | 0.1 | 0.91 | 0.7 | 1260 |
| 19-17 | 100 | 1.8 | 0.3 | 0.1 | 0.3 | 0.1 | 0.91 | 0.8 | 1270 |
| 19-18 | 100 | 1.8 | 0.3 | 0.1 | 0.4 | 0.1 | 0.91 | 0.8 | 1240 |
| 19-19 | 100 | 1.8 | 0.3 | 0.1 | 0.2 | 0.2 | 0.91 | 0.8 | 1270 |

Samples marked with * lie outside the scope of the invention.

An Ag paste (Ag/Pd=30/70) was printed to form an internal electrode. The laminate was cut into 3.2 mm×1.6 mm and was fired in the air at 1250° to 1340° C. for two hours. Then, the electrodes of the silver paste were printed on both end surfaces at 800° C. for 10 minutes to obtain samples for measurement.

The thus obtained samples were measured for their capacitances and dielectric losses at a reference temperature of 25° C., a frequency of 1.0 KHz and a voltage of 1.0 Vrms. The change of capacitance depending upon the temperature was measured over a range of from −55° to +125° C., and the capacitance at +25° C. was used as a reference. The insulation resistance was measured at a moment after a DC voltage of 25 V was applied for one minute. The dielectric constant was calculated from the capacitance.

As for the average particle diameter of the sintered product, the surface of the sintered product was observed using a scanning-type electron microscope at a magnification of 15000 times, and particles of more than 500 were measured and calculated by the line intercepting method. Furthermore, the dielectric loss was measured by applying a voltage of 2000 Vrms/cm at a frequency of 1 KHz. The results were as shown in Table 40.

TABLE 40

| Sample No. | Cap nF | $\epsilon_r$ | tan δ | IR MΩ | Tcc (%) | Particle diameter (μm) | 2000 V/cm tan δ % |
|---|---|---|---|---|---|---|---|
| 19-1 | 173.8 | 3600 | 2.5 | 4 × 10$^4$ | −13–+5 | 0.3 | 2.9 |
| 19-2 | 140.0 | 2900 | 1.7 | 5 × 10$^4$ | −5–+3 | 0.4 | 2.6 |
| 19-3 | 125.8 | 2600 | 1.6 | 3 × 10$^4$ | −8–+12 | 0.4 | 2.5 |
| 19-4 | 135.7 | 2800 | 2.1 | 3 × 10$^4$ | −2–+6 | 0.4 | 2.8 |
| 19-5 | 145.1 | 3000 | 1.6 | 6 × 10$^4$ | −4–+7 | 0.3 | 2.5 |
| 19-6 | 168.5 | 3500 | 1.8 | 5 × 10$^4$ | −11–+7 | 0.4 | 2.8 |
| 19-7 | 144.8 | 3000 | 2.2 | 2 × 10$^4$ | −4–+7 | 0.4 | 3.0 |
| 19-8 | 140.1 | 2900 | 1.8 | 5 × 10$^4$ | −4–+7 | 0.5 | 2.7 |
| 19-9 | 134.6 | 2800 | 1.4 | 9 × 10$^4$ | −3–+5 | 0.9 | 2.2 |
| 19-10 | 150.3 | 3100 | 1.6 | 5 × 10$^4$ | −4–+5 | 0.3 | 2.6 |
| 19-11 | 155.1 | 3200 | 1.6 | 5 × 10$^4$ | −4–+6 | 0.4 | 2.6 |
| 19-12 | 148.9 | 3100 | 1.6 | 5 × 10$^4$ | −4–+8 | 0.4 | 2.6 |
| 19-13 | 145.0 | 3000 | 1.8 | 4 × 10$^4$ | −5–+10 | 0.5 | 2.8 |
| 19-14 | 142.0 | 2900 | 1.7 | 5 × 10$^4$ | −7–+4 | 0.3 | 2.6 |
| 19-15 | 130.5 | 2700 | 1.8 | 4 × 10$^4$ | −7–+3 | 0.4 | 2.6 |

TABLE 40-continued

| Sample No. | Cap nF | $\epsilon_r$ | tan δ | IR MΩ | Tcc (%) | Particle diameter (μm) | 2000 V/cm tan δ % |
|---|---|---|---|---|---|---|---|
| 19-16 | 141.0 | 2900 | 1.8 | 4 × 10$^4$ | −3–+6 | 0.4 | 2.7 |
| 19-17 | 154.8 | 3200 | 1.8 | 5 × 10$^4$ | −6–+5 | 0.3 | 2.7 |
| 19-18 | 158.9 | 3300 | 1.8 | 5 × 10$^4$ | −9–+6 | 0.3 | 2.8 |
| 19-19 | 139.2 | 2900 | 1.6 | 8 × 10$^4$ | −4–+6 | 0.4 | 2.3 |

Samples marked with * lie outside the scope of the invention.

The dielectric ceramic compositions lying within the scope of the present invention all have dielectric constants which are as large as 2500 or more and satisfy X7R characteristics (change in the capacitance is within +15% over a temperature range of from −55° C. to +125° C.) stipulated under the EIA Standards. Moreover, the dielectric deramic compositions have dielectric losses tan δ which are as small as 2.5% or less and exhibit losses of not larger than 3.0% even under the application of an AC voltage of 2000 Vrms/cm. The compositions further have insulation resistances (IR) of not smaller than 10$^4$ MΩ.

Example 20

To the composition of the sample No. 19-5 of Table 39 were added the powders of SiO$_2$ and Al$_2$O$_3$ in amounts as shown in Table 41, and the mixture was formed into a tape in the same manner as in Example 19. The tape was laminated, an internal electrode was formed, and a laminate was prepared. Properties were measured in the same manner as in Example 19. The results were as shown in Table 42.

The sample possessed a composition comprising 1.8 parts by weight of Nb$_2$O$_5$, 0.2 parts by weight of MgO, 0.2 parts by weight of La$_2$O$_3$, 0.1 part by weight of MnO reckoned as MnCO$_3$, and SiO$_2$ and Al$_2$O$_3$ in predetermined amounts per 100 parts by weight of BaTiO$_3$.

TABLE 41

| Sample No. | BaTiO$_3$ pts.by wt. | SiO$_2$ pts.by wt. | Al$_2$O$_3$ pts.by wt. | Firing temp. (°C.) |
| --- | --- | --- | --- | --- |
| 20-1 | 100 | 0.05 | — | 1240 |
| 20-2 | 100 | 0.1 | — | 1240 |
| 20-3 | 100 | 0.5 | — | 1220 |
| 20-4 | 100 | — | 0.05 | 1250 |
| 20-5 | 100 | — | 0.2 | 1240 |
| 20-6 | 100 | — | 0.5 | 1230 |
| 20-7 | 100 | 0.03 | 0.02 | 1240 |
| 20-8 | 100 | 0.2 | 0.3 | 1230 |

TABLE 42

| Sample No. | Cap nF | εr | tan δ | IR MΩ | Tcc (%) | Particle diameter (μm) | 2000 V/cm tan δ % |
| --- | --- | --- | --- | --- | --- | --- | --- |
| 20-1 | 154.5 | 3200 | 1.6 | 5 × 10$^4$ | −4−+7 | 0.4 | 2.5 |
| 20-2 | 156.0 | 3200 | 1.6 | 6 × 10$^4$ | −4−+7 | 0.4 | 2.5 |
| 20-3 | 159.1 | 3300 | 1.6 | 6 × 10$^4$ | −7−+9 | 0.4 | 2.4 |
| 20-4 | 148.3 | 3100 | 1.6 | 5 × 10$^4$ | −4−+7 | 0.4 | 2.6 |
| 20-5 | 153.4 | 3200 | 1.6 | 5 × 10$^4$ | −5−+7 | 0.4 | 2.5 |
| 20-6 | 158.8 | 3300 | 1.7 | 6 × 10$^4$ | −6−+7 | 0.4 | 2.5 |
| 20-7 | 150.1 | 3100 | 1.6 | 5 × 10$^4$ | −4−+7 | 0.4 | 2.6 |
| 20-8 | 158.7 | 3300 | 1.7 | 6 × 10$^4$ | −7−+8 | 0.4 | 2.5 |

It will be understood from these Tables 41 and 42 that with SiO$_2$ and Al$_2$O$_3$ being contained, the compositions are fired at temperatures lower than those of when these compounds are not contained (sample No. 19-5) and exhibit increased dielectric constants.

We claim:

1. A dielectric ceramic composition containing, per 100 parts by weight of BaTiO$_3$, at least either one of Nb$_2$O$_5$ or Ta$_2$O$_5$ in an amount of from 0.8 to 3.5 parts by weight, MgO in an amount of from 0.06 to 0.7 parts by weight, oxides of rare earth elements in an amount of from 0.005 to 0.520 parts by weight, and MnO in the form of MnCO$_3$ in an amount of from 0.01 to 0.30 parts by weight the molar ratio of MgO to Nb$_2$O$_5$ or Ta$_2$O$_5$ being from 0.5 to 2.2, whereby the dielectric ceramic composition exhibits a dielectric constant not smaller than 2500.

2. A dielectric ceramic composition according to claim 1, containing, per 100 parts by weight of BaTiO$_3$, Nb$_2$O$_5$ in an amount of from 0.8 to 2.5 parts by weight, MgO in an amount of from 0.06 to 0.7 parts by weight, oxides of rare earth elements in an amount of from 0.005 to 0.520 parts by weight, and MnO in the form of MnCO$_3$ in an amount of from 0.01 to 0.30 parts by weight, the molar ratio of MgO to Nb$_2$O$_5$ being from 0.5 to 2.2, whereby the dielectric ceramic composition exhibits a dielectric constant not smaller than 2500.

3. A dielectric ceramic composition according to claim 2, wherein said oxide of a rare earth element is La$_2$O$_3$.

4. A dielectric ceramic composition according to claim 2, wherein said oxide of a rare earth element is Nd$_2$O$_3$.

5. A dielectric ceramic composition according to claim 2, wherein said oxide of a rare earth element is Pr$_6$O$_{11}$.

6. A dielectric ceramic composition according to claim 2, wherein said oxide of a rare earth element is Gd$_2$O$_3$.

7. A dielectric ceramic composition according to claim 2, wherein said oxide of a rare earth element is Tb$_4$O$_7$.

8. A dielectric ceramic composition according to claim 2, wherein said oxide of a rare earth element is Sm$_2$O$_3$.

9. A dielectric ceramic composition according to claim 1, containing, per 100 parts by weight of BaTiO$_3$, Ta$_2$O$_5$ in an amount of from 1.3 to 3.5 parts by weight, MgO in an amount of from 0.06 to 0.6 parts by weight, oxides of rare earth elements in an amount of from 0.005 to 0.50 parts by weight, and MnO in the form of MnCO$_3$ in an amount of from 0.01 to 0.30 parts by weight, the molar ratio of MgO to Ta$_2$O$_5$ being from 0.5 to 2.0, whereby the dielectric ceramic composition exhibits a dielectric constant not smaller than 2500.

10. A dielectric ceramic composition according to claim 9, wherein said oxide of a rare earth element is La$_2$O$_3$.

11. A dielectric ceramic composition according to claim 9, wherein said oxide of a rare earth element is Nd$_2$O$_3$.

12. A dielectric ceramic composition according to claim 9, wherein said oxide of a rare earth element is Pr$_6$O$_{11}$.

13. A dielectric ceramic composition according to claim 9, wherein said oxide of a rare earth element is Gd$_2$O$_3$.

14. A dielectric ceramic composition according to claim 9, wherein said oxide of a rare earth element is Tb$_4$O$_7$.

15. A dielectric ceramic composition according to claim 9, wherein said oxide of a rare earth element is Sm$_2$O$_3$.

16. A dielectric ceramic composition according to claim 1, which further contains at least either SiO$_2$ or Al$_2$O$_3$ in an amount of from 0.05 to 0.50 parts by weight per 100 parts by weight of BaTiO$_3$.

17. A dielectric ceramic composition according to claim 1, which further contains ZnO in an amount of not larger than 0.5 parts by weight per 100 parts by weight of BaTiO$_3$.

18. A dielectric ceramic composition according to claim 1, which further contains ZnO in an amount of from 0.1 to 0.5 parts by weight per 100 parts by weight of BaTiO$_3$, the molar ratio of the resultant amount of MgO and ZnO to Nb$_2$O$_5$ or Ta$_2$O$_5$ being from 0.5 to 2.2.

* * * * *